United States Patent
Yano

(10) Patent No.: US 9,833,695 B2
(45) Date of Patent: Dec. 5, 2017

(54) SYSTEM AND METHOD FOR PRESENTING A VIRTUAL COUNTERPART OF AN ACTION FIGURE BASED ON ACTION FIGURE STATE INFORMATION

(71) Applicant: Jumo Inc., Camden, DE (US)

(72) Inventor: Keiichi Yano, Tokyo (JP)

(73) Assignee: Jumo, Inc., Camden, DE (US)

( * ) Notice: Subject to any disclaimer, the term of this patent is extended or adjusted under 35 U.S.C. 154(b) by 0 days.

(21) Appl. No.: 14/622,287

(22) Filed: Feb. 13, 2015

(65) Prior Publication Data
US 2016/0236085 A1 Aug. 18, 2016

(51) Int. Cl.
| | | |
|---|---|---|
| *A63F 9/24* | (2006.01) | |
| *A63H 3/00* | (2006.01) | |
| *A63F 13/65* | (2014.01) | |
| *A63F 13/42* | (2014.01) | |

(Continued)

(52) U.S. Cl.
CPC .............. *A63F 9/24* (2013.01); *A63F 13/217* (2014.09); *A63F 13/235* (2014.09); *A63F 13/42* (2014.09); *A63F 13/65* (2014.09); *A63H 3/003* (2013.01)

(58) Field of Classification Search
CPC ...... A63H 2200/00; A63H 3/00; A63H 3/003; A63F 13/02; A63F 13/12; A63F 13/00; A63F 2300/10; A63F 2300/1043; A63F 2300/6045; A63F 2300/65; A63F 9/24;

(Continued)

(56) References Cited

U.S. PATENT DOCUMENTS

| | | | |
|---|---|---|---|
| 5,766,077 A | 6/1998 | Hongo | 463/30 |
| 6,012,961 A | 1/2000 | Sharpe, III et al. | 446/298 |
| 6,159,101 A | 12/2000 | Simpson | 463/46 |

(Continued)

FOREIGN PATENT DOCUMENTS

| | | |
|---|---|---|
| WO | 2014/055924 | 4/2014 |
| WO | 2016/130378 | 8/2016 |

(Continued)

OTHER PUBLICATIONS

U.S. Appl. No. 14/645,228, a non-Final Office Action, dated May 22, 2015, 45 pages.

(Continued)

*Primary Examiner* — Jasson Yoo
(74) *Attorney, Agent, or Firm* — Sheppard Mullin Richter & Hampton LLP

(57) ABSTRACT

In certain implementations, a presentation of a virtual counterpart of an action figure may be provided based on action figure state information obtained via wireless communication with the action figure. As an example, an action figure may be detected within a short wireless communication range of a computer system. A wireless connection between the computer system and the action figure may be established based on the detection. Action figure state information identifying a position of a moveable part of the action figure relative to another part of the action figure may be received at the computer system from the action figure via the wireless connection. The relative position may be related to a pose exhibited by the action figure. A virtual counterpart of the action figure may be presented based on the relative position such that the virtual counterpart exhibits the same pose as the action figure.

16 Claims, 10 Drawing Sheets

(51) Int. Cl.
*A63F 13/217* (2014.01)
*A63F 13/235* (2014.01)

(58) Field of Classification Search
CPC ...... A63F 13/235; A63F 13/42; A63F 13/217; A63F 13/65; A63F 13/428; A63F 13/30
USPC ..................................... 446/175, 484; 463/1
See application file for complete search history.

(56) References Cited

U.S. PATENT DOCUMENTS

| | | | |
|---|---|---|---|
| 6,290,565 B1* | 9/2001 | Galyean, III et al. | 446/99 |
| 6,338,679 B1* | 1/2002 | Okada | G06F 3/14 463/30 |
| 6,354,947 B1 | 3/2002 | Dobrusskin et al. | 463/43 |
| 6,773,325 B1 | 8/2004 | Mawle et al. | 446/175 |
| 6,773,344 B1 | 8/2004 | Gabai et al. | 463/1 |
| 7,066,781 B2 | 6/2006 | Weston | 446/268 |
| 7,502,759 B2 | 3/2009 | Hannigan et al. | 705/51 |
| 7,610,233 B1 | 10/2009 | Leong et al. | 705/37 |
| 7,828,295 B2 | 11/2010 | Matsumoto et al. | 273/238 |
| 7,843,471 B2 | 11/2010 | Doan et al. | 345/633 |
| 7,862,428 B2 | 1/2011 | Borge | 463/29 |
| 8,257,157 B2 | 9/2012 | Polchin | 463/9 |
| 8,287,372 B2 | 10/2012 | Hong et al. | 463/34 |
| 8,585,497 B2 | 11/2013 | Borge | 463/29 |
| 8,595,811 B2 | 11/2013 | Johnson et al. | 726/9 |
| 8,602,857 B2 | 12/2013 | Morichau-Beauchant et al. | 463/6 |
| 8,636,588 B2 | 1/2014 | Borge | 463/29 |
| 8,734,242 B2 | 5/2014 | Borge | 463/29 |
| 8,858,339 B2 | 10/2014 | Reiche et al. | 463/42 |
| 9,205,336 B1 | 12/2015 | Yano | |
| 9,259,651 B1 | 2/2016 | Yano | |
| 9,266,027 B1 | 2/2016 | Yano | |
| 9,361,067 B1 | 6/2016 | Yano | |
| 9,440,158 B1 | 9/2016 | Yano | |
| 9,474,964 B2 | 10/2016 | Yano | |
| 2003/0027636 A1 | 2/2003 | Covannon et al. | 463/42 |
| 2005/0059483 A1 | 3/2005 | Borge | 463/29 |
| 2005/0220044 A1* | 10/2005 | Choi | A63F 13/10 370/310 |
| 2005/0266920 A1 | 12/2005 | Kaku et al. | 463/31 |
| 2006/0070029 A1 | 3/2006 | Laborczfalvi et al. | 717/120 |
| 2006/0084362 A1 | 4/2006 | Ghaly | 446/484 |
| 2006/0273909 A1 | 12/2006 | Heiman et al. | 340/572.7 |
| 2007/0015588 A1 | 1/2007 | Matsumoto et al. | 463/43 |
| 2007/0097832 A1* | 5/2007 | Koivisto | A63F 3/08 369/63 |
| 2007/0197297 A1 | 8/2007 | Witchey | 463/42 |
| 2008/0081694 A1 | 4/2008 | Hong et al. | 463/34 |
| 2009/0011809 A1* | 1/2009 | Onuki | A63F 13/10 463/7 |
| 2009/0053970 A1 | 2/2009 | Borge | 446/268 |
| 2009/0054155 A1 | 2/2009 | Borge | 463/42 |
| 2009/0098792 A1* | 4/2009 | Cheng | A63H 3/28 446/219 |
| 2009/0117819 A1 | 5/2009 | Nakamura | 446/297 |
| 2009/0158210 A1 | 6/2009 | Cheng et al. | 715/810 |
| 2010/0088650 A1 | 4/2010 | Kaltenbach et al. | 715/849 |
| 2010/0151940 A1 | 6/2010 | Borge | 463/29 |
| 2011/0014984 A1 | 1/2011 | Penman et al. | 463/42 |
| 2011/0021109 A1* | 1/2011 | Le | A63H 3/28 446/300 |
| 2011/0047600 A1 | 2/2011 | Johnson et al. | 726/4 |
| 2011/0124264 A1 | 5/2011 | Garbos | 446/147 |
| 2012/0191880 A1 | 7/2012 | Gandhi et al. | 710/16 |
| 2012/0295703 A1 | 11/2012 | Reiche et al. | 463/31 |
| 2013/0044570 A1 | 2/2013 | Mkrtchyan | 367/197 |
| 2013/0288563 A1 | 10/2013 | Zheng et al. | 446/268 |
| 2013/0296058 A1 | 11/2013 | Leyland et al. | 463/42 |
| 2013/0307848 A1 | 11/2013 | Tena et al. | 345/420 |
| 2014/0030955 A1* | 1/2014 | Smetanin et al. | 446/268 |
| 2014/0057527 A1* | 2/2014 | Fessenmaier | A63H 30/04 446/484 |
| 2014/0088750 A1 | 3/2014 | Sharma et al. | 700/118 |
| 2014/0114630 A1 | 4/2014 | Brave | 703/6 |
| 2014/0121008 A1 | 5/2014 | Canessa | 463/29 |
| 2014/0162785 A1 | 6/2014 | Reiche et al. | 463/35 |
| 2014/0227676 A1 | 8/2014 | Noshadi et al. | 434/365 |
| 2014/0273717 A1 | 9/2014 | Judkins et al. | 446/175 |
| 2014/0273721 A1 | 9/2014 | Katan et al. | 446/268 |
| 2014/0274313 A1 | 9/2014 | Bala et al. | 463/25 |
| 2014/0357373 A1 | 12/2014 | Barney et al. | 463/37 |
| 2015/0038229 A1 | 2/2015 | Reiche et al. | 463/35 |
| 2015/0080121 A1 | 3/2015 | Garlington et al. | 463/31 |
| 2015/0174479 A1 | 6/2015 | Reiche et al. | |
| 2015/0360139 A1* | 12/2015 | Watry | A63H 33/26 446/484 |
| 2015/0375128 A1* | 12/2015 | Villar | A63H 30/02 446/454 |
| 2016/0236080 A1 | 8/2016 | Yano | |
| 2016/0236093 A1 | 8/2016 | Yano | |
| 2016/0243453 A1 | 8/2016 | Yano | |
| 2016/0256791 A1 | 9/2016 | Yano | |

FOREIGN PATENT DOCUMENTS

| | | |
|---|---|---|
| WO | 2016/130379 | 8/2016 |
| WO | 2016/140759 | 9/2016 |
| WO | 2016/144442 | 9/2016 |

OTHER PUBLICATIONS

U.S. Appl. No. 14/622,354, a non-Final Office Action, dated Jun. 5, 2015, 12 pages.
U.S. Appl. No. 14/622,386, a non-Final Office Action, dated Jul. 6, 2015, 14 pages.
U.S. Appl. No. 14/622,321, a non-Final Office Action, dated Jul. 24, 2015, 10 pages.
U.S. Appl. No. 14/645,228, a Final Office Action, dated Sep. 15, 2015, 28 pages.
U.S. Appl. No. 14/961,040, a non-final office Action, dated Jan. 20, 2016, 23 pages.
U.S. Appl. No. 14/645,228, a Notice of Allowance, dated Apr. 11, 2016, 20 pages.
U.S. Appl. No. 14/636,115, a Notice of Allowance, dated Oct. 7, 2015, 9 pages.
U.S. Appl. No. 14/622,386, a Notice of Allowance, dated Nov. 30, 2015, 9 pages.
U.S. Appl. No. 14/622,354, a Notice of Allowance, dated Dec. 22, 2015, 10 pages.
U.S. Appl. No. 14/622,321, a non-final Office Action, dated Jan. 6, 2016, 12 pages.
International Patent Application No. PCT/US2016/016303, an International Search Report and Written Opinion dated Jun. 16, 2016, 16 pages.
U.S. Appl. No. 14/961,040, a Notice of Allowance, dated Jun. 28, 2016, 9 pages.
U.S. Appl. No. 14/622,321, a Notice of Allowance, dated Aug. 10, 2016, 8 pages.
U.S. Appl. No. 15/047,827, a non-final Office Action, dated Aug. 15, 2016, 13 pages.

* cited by examiner

SYSTEM AND METHOD FOR PRESENTING A VIRTUAL COUNTERPART OF AN ACTION FIGURE BASED ON ACTION FIGURE STATE INFORMATION

CROSS-REFERENCE TO RELATED APPLICATIONS

This application is related to following, co-pending U.S. utility patent applications, filed on even date herewith: (1) U.S. patent application Ser. No. 14/622,321, entitled "SYSTEM AND METHOD FOR PROVIDING STATE INFORMATION OF AN ACTION FIGURE," (2) U.S. patent application Ser. No. 14/622,354, entitled "SYSTEM AND METHOD FOR PROVIDING AN ENHANCED MARKETING, SALE, OR ORDER FULFILLMENT EXPERIENCE RELATED TO ACTION FIGURES OR ACTION FIGURE ACCESSORIES HAVING CORRESPONDING VIRTUAL COUNTERPARTS," and (3) U.S. patent application Ser. No. 14/622,386, entitled "SYSTEM AND METHOD FOR PROVIDING RELEVANT NOTIFICATIONS VIA AN ACTION FIGURE," each of which is hereby incorporated by reference herein in its entirety.

FIELD OF THE INVENTION

The invention relates to providing interactive action figures or action figure accessories that have corresponding virtual counterparts in a virtual environment, and more particularly to a system and method of providing a presentation of a virtual counterpart of an action figure in a virtual environment based on action figure state information (or other information).

BACKGROUND OF THE INVENTION

In recent years, a number of video game/toy hybrid systems have emerged where figurines of movie, comic, or story characters can "come to life" in a video game. As an example, typical video game/toy hybrid systems enable a player to "import" a character represented by a figurine into the video game by placing the figurine on a portal device attached to a game console. Each game session may require the player to import the character (via the placement of the figurine) to utilize the character to accomplish various tasks in the game during the session. From the perspective of the player, the figurine and the character may become "synonymous" with one another as the player continues to use the figurine to access the character in the video game. As the character grows in-game (e.g., levels up) and obtains new abilities and special powers, the value of the figurine to the player may also increase—further adding to the collectability value of the figurine.

Typical video game/toy hybrid systems are, however, limited with respect to the interactions between the player and the figurine. For example, during gameplay, figurines are used by a player to select one or more characters to use in a game by placing the figurines corresponding to the characters on a portal device. All other user interactions with the game generally do not involve the figurines. These and other drawbacks exist.

SUMMARY OF THE INVENTION

The invention addressing these and other drawbacks relates to methods, apparatuses, or systems for providing interactive action figures or action figure accessories that have corresponding virtual counterparts in a virtual environment. As used herein, an action figure may comprise a figurine, made of plastic or other materials, having one or more moveable parts (e.g., moveable appendages or other moveable parts) that allow the action figure to exhibit various poses. An action figure accessory may comprise one or more physical objects that modify or supplement the functionality or appearance of an action figure (e.g., to make the action figure more useful, versatile, or attractive, to change the appearance of the action figure, etc.). A virtual environment may comprise a virtual space, a game space, a virtual universe, or other virtual environment. A host of the virtual environment may comprise one or more virtual universe servers, game servers, or other components that host the virtual environment.

In accordance with one aspect of the invention, a user may interact with a virtual environment or control a virtual counterpart of an action figure in the virtual environment by manipulating an action figure or its moveable parts, such as manipulating the positions and orientations of the action figure's moveable parts. As an example, sensors located on different parts of the action figure (e.g., sensors located on in the body and appendages of the action figure) may obtain sensor information that reflects the user manipulation of the action figure or its moveable parts. The sensor information may be utilized to generate action figure state information that identifies the current positions and orientations of the action figure's moveable parts relative to other parts of the action figure. The relative positions and orientations of the action figure's moveable parts may then be utilized to cause the action figure's virtual counterpart to exhibit a pose in the virtual environment that reflects the relative positions and orientations of the action figure's moveable parts. A presentation of the virtual counterpart exhibiting the corresponding pose in the virtual environment may be generated and provided to a user of the virtual environment. In this way, the user may interact with the virtual environment or control the virtual counterpart by interacting with the action figure in the real-world environment.

In an implementation, one or more of the moveable parts of an action figure may each be equipped with one or more magnetic field sensors, accelerators, gyroscopes, or other sensors (e.g., proximity sensors, global positioning system (GPS) sensors, impact sensors, water sensors, temperature sensors, cameras, etc.) so that sensor information related to the moveable parts may be obtained and utilized to generate state information identifying the positions and orientations of the moveable parts (or other state of the action figure). One or more magnetic field sensors, accelerators, gyroscopes, or other sensors may also be located on other parts of the action figure (e.g., a non-moveable part, a body of the action figure, etc.) that can be used as a reference when accessing the relative positions or orientations of the moveable parts. Additionally, or alternatively, one or more moveable parts may be utilized as a reference when accessing the relative positions or orientations of one or more other moveable parts.

In an implementation, an action figure may obtain sensor information via its sensors and utilize the sensor information to generate state information identifying a state of the action figure, such as (i) the positions, orientations, or other aspects of moveable parts of the action figure relative to one another or other parts of the action figure, (ii) a position, orientation, or other aspect of the action figure relative to other action figures, accessories, or an environment of the action figure, or (iii) other state. The action figure may then provide the state information to a host of a virtual environment that utilizes the state information to manipulate a virtual counterpart of the action figure, other virtual counterparts, or the virtual environment. A virtual environment host may, for example, comprise one or more virtual universe servers, game servers, or other components that host the virtual environment (e.g., a virtual space, a game space, a virtual universe, or other virtual environment).

In an implementation, state information generated at an action figure may be provided from the action figure to a host of a virtual environment via a wireless connection established between the action figure and a user device that communicates with the virtual environment host. As an example, when the action figure and/or the user device are detected within one another's short wireless communication range (e.g., WiFi, Bluetooth, Near Field Communication (NFC), etc.), a wireless connection may be established between the action figure and the user device based on the detection. Upon establishment, the action figure may transmit its generated state information to the user device via the wireless connection. The user device may then transmit the state information to a host of a virtual environment that utilizes the state information to manipulate a virtual counterpart of the action figure, other virtual counterparts, or the virtual environment. In this way, the user device may act as an intermediary between the action figure and the virtual environment host. Additionally, or alternatively, the action figure may transmit the state information to the virtual environment host without the need for the user device as an intermediary (e.g., the action figure may establish a direct WiFi or other wireless connection with a network router that enables the action figure to communicate with the virtual environment host via the Internet).

In an implementation, sensor information that reflects user manipulation of an action figure or its moveable parts may be obtained and utilized to generate action figure behavior information. The generated behavior information may, for example, identify a behavior of the action figure, such as (i) movements of the action figure's moveable parts relative to one another or other parts of the action figure (e.g., a direction, a distance, velocity, acceleration, etc., in which a moveable part of the action figure is moved, an orientation of the moveable part during a movement of the moveable part, or other aspect of the movement), (ii) movements of the action figure relative to other action figures, accessories, or an environment of the action figure, or (iii) or other behavior. The behavior information may then be provided to a host of a virtual environment that utilizes the behavior information to manipulate a virtual counterpart of the action figure, other virtual counterparts, or the virtual environment. As an example, behavior information identifying one or more movements of the action figure's moveable parts relative to one another or other parts of the action figure may be utilized to cause the virtual counterpart to exhibit one or more actions in the virtual environment that correspond to the relative movements of the action figure's moveable parts. A presentation of the virtual counterpart exhibiting the corresponding actions in the virtual environment may be generated and provided to a user of the virtual environment.

It should be noted that, although implementations described herein are with respect to action figures and action figure accessories, it is understood that (to the extent possible) other objects may be used in place of action figures and/or action figure accessories. As an example, in an implementation, state or behavior information identifying a state or behavior of a real-world object may be utilized to cause a corresponding virtual object to exhibit a state or behavior in a virtual environment that corresponds to the identified state or behavior of the real-world object. Additionally, or alternatively, a presentation of the corresponding virtual object in or exhibiting the corresponding state or behavior in the virtual environment may be provided to a user of the virtual environment.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Exemplary System Description

Figure 1:
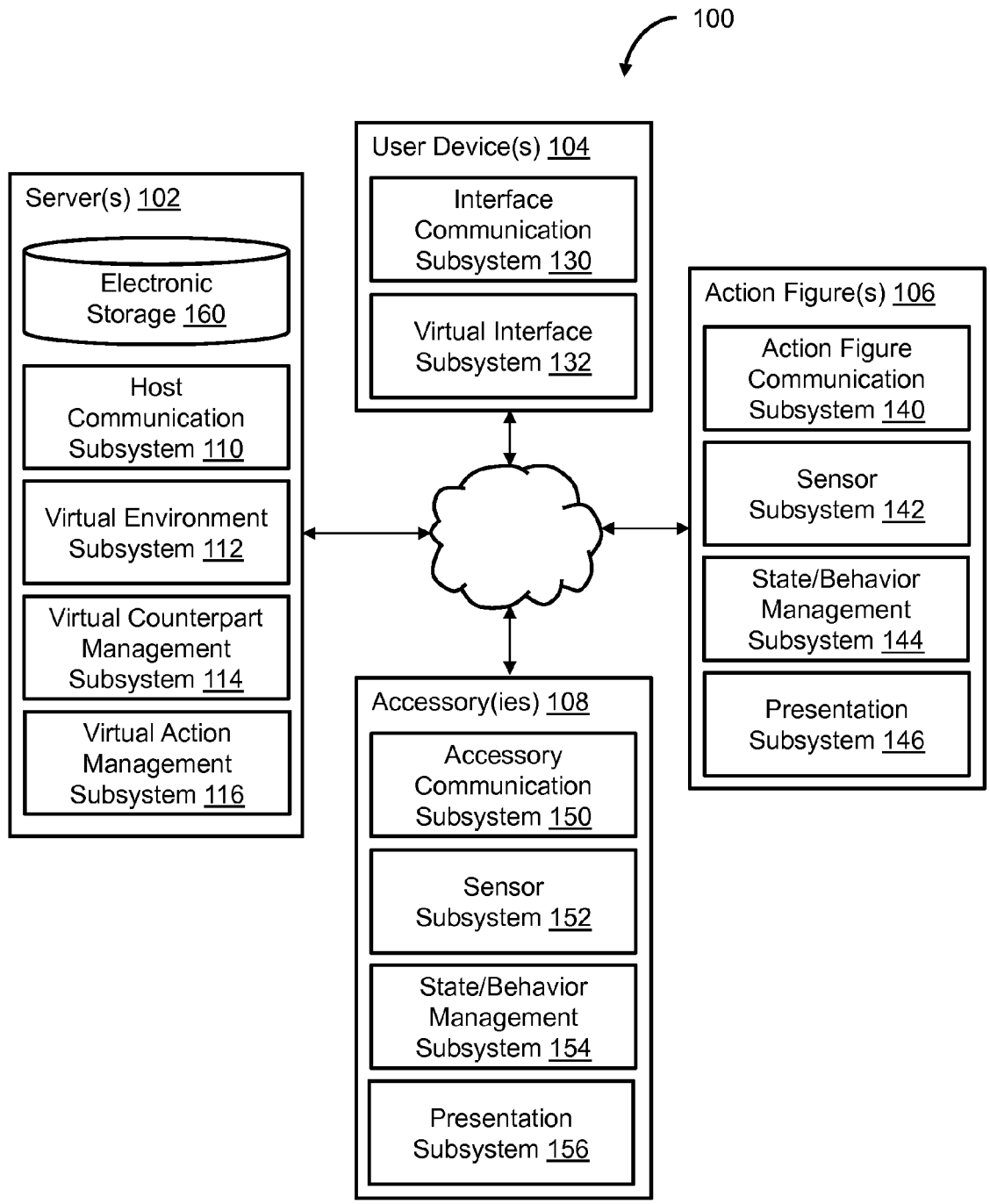
FIG. 1 is an exemplary illustration of a system for providing interactive action figures or action figure accessories that have corresponding virtual counterparts in a virtual environment, in accordance with an aspect of the invention.

FIG. 1 is an exemplary illustration of a system 100 for providing interactive action figures or action figure accessories that have corresponding virtual counterparts in a virtual environment, in accordance with an aspect of the invention. As shown in FIG. 1, system 100 may comprise server 102 (or multiple servers 102). Server 102 may comprise host communication subsystem 110, virtual environment subsystem 112, virtual counterpart management subsystem 114, virtual action management subsystem 116, or other components.

System 100 may further comprise a user device 104 (or multiple user devices 104). User device 104 may comprise any type of mobile terminal, fixed terminal, or other device. By way of example, user device 104 may comprise a desktop computer, a notebook computer, a netbook computer, a tablet computer, a smartphone, a navigation device, an electronic book device, a gaming device, or other user device. Users may, for instance, utilize one or more user devices 104 to interact with server 102, other user devices 104, action FIG. 106, action figure accessories 108, or other components of system 100.

User device 104 may comprise interface communication subsystem 130, virtual interface subsystem 132, or other components. It should be noted that, while one or more operations are described herein as being performed by components of one of server 102 or user device 104, those operations may, in some implementations, be performed by components of the other one of service 102 or user device 104.

Action FIG. 106 may comprise action figure communication subsystem 140, sensor subsystem 142, state/behavior management subsystem 144, presentation subsystem 146, or other components. Action figure accessory 108 may comprise accessory communication subsystem 150, sensor subsystem 152, state/behavior management subsystem 154, presentation subsystem 156, or other components. It should be noted that, while one or more operations are described herein as being performed by components of one of action FIG. 106 or action figure accessory 108, those operations may, in some implementations, be performed by components of the other one of action FIG. 106 or action figure accessory 108.

In some implementations, user device 104 may act as an intermediary between server 102, action FIG. 106, and/or accessory 108. As an example, information may be provided from server 102 to action FIG. 106 or accessory 108 via virtual interface subsystem 132 of user device 104, and information may be provided from action FIG. 106 or accessory 108 to server 102 via virtual interface subsystem 132 of user device 104. In other implementations, server 102, action FIG. 106, and/or accessory 108 may receive information from or transmit information to one another without the need for user device 104 through one or more wired or wireless means. As such, although some implementations are described herein with respect to the use of user device 104 (or virtual interface subsystem 132) as an intermediary between server 102, action FIG. 106, and/or accessory 108, it is understood that (to the extent possible) receipt and transmission of information between server 102, action FIG. 106, and/or accessory 108 may be performed without the need for user device 104 as an intermediary.

In some implementations, the various computers and subsystems illustrated in FIG. 1 may comprise one or more computing devices that are programmed to perform the functions described herein. The computing devices may include one or more electronic storages (e.g., electronic storage 160, or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 110-156 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 110-156 described herein is for illustrative purposes, and is not intended to be limiting, as any of subsystems 110-156 may provide more or less functionality than is described. For example, one or more of subsystems 110-156 may be eliminated, and some or all of its functionality may be provided by other ones of subsystems 110-156. As another example, additional subsystems may be programmed to perform some or all of the functionality attributed herein to one of subsystems 110-156.

Attention will now be turned to a more detailed description of various implementations comprising one or more features related to providing interactive action figures and/or action figure accessories that have corresponding virtual counterparts in a virtual environment. It should be noted that features described herein may be implemented separately or in combination with one another.

Presentation of Virtual Counterparts Based on Action Figure State/Behavior

In an implementation, action figure state or behavior information obtained from an action figure may be utilized to cause a virtual counterpart of the action figure to exhibit a state or behavior that corresponds to a state or behavior of the action figure. A presentation of the virtual counterpart of the action figure in or exhibiting the corresponding state or behavior in a virtual environment may be provided to a user of the virtual environment. In some implementations, state or behavior information identifying states or behaviors of multiple action figures or accessories may be obtained from one or more of the action figures or accessories. The state or behavior information may then be utilized to cause virtual counterparts of the action figures or accessories to exhibit states or behaviors that correspond to states or behaviors of the action figures or accessories. The virtual counterparts may then be presented exhibiting the corresponding state or behaviors.

In an implementation, interface communication subsystem 130 may be programmed to detect action FIG. 106 within a short wireless communication range of user device 104. Based on the detection of action FIG. 106, interface communication subsystem 130 may be programmed to establish a wireless connection between user device 104 and action FIG. 106. Additionally, or alternatively, interface communication subsystem 130 may detect one or more accessories 108, other action FIG. 106, or other objects within a short wireless communication range of user device 104, and establish respective wireless connections with the detected objects.

As an example, if interface communication subsystem 130 enables wireless communication between user device 104 and the other object (e.g., action FIG. 106, accessory 108, etc.) via NFC technology, the other object may need to be within an NFC communication range in order for the other object to be detected and an NFC communication session to be established between user device 104 and the other object. As another example, if interface communication subsystem 130 enables wireless communication between user device 104 and the other object via Bluetooth technology, the other object may need to be within a Bluetooth communication range in order for the other object to be detected and a Bluetooth communication session to be established between user device 104 and the other object. As yet another example, if interface communication subsystem 130 enables wireless communication between user device 104 and the other object via Wi-Fi technology, the other object may need to be within a Wi-Fi communication range in order for the other object to be detected and a Wi-Fi communication session to be established between user device 104 and the other object.

Figure 2A:
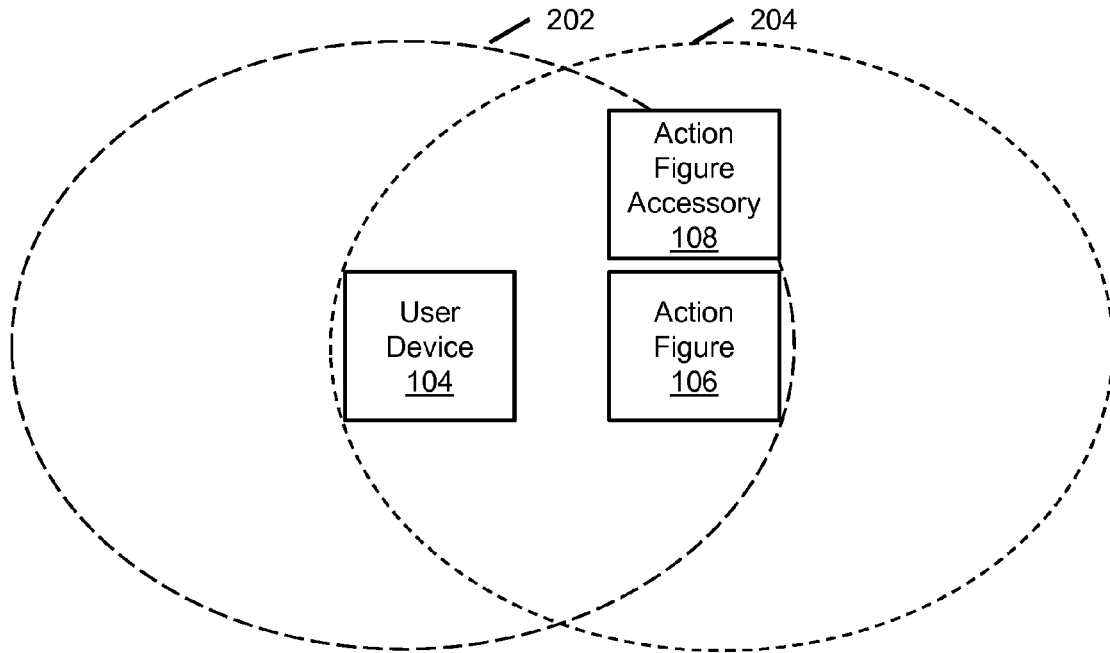
FIGS. 2A and 2B are exemplary illustrations of scenarios in which user devices, action figures, or action figure accessories communicate with one another via a short-range wireless connection, in accordance with aspects of the invention.

In one scenario, as shown in FIG. 2A, objects within area 202 may be within a wireless communication range of user device 104, and objects within area 204 may be within a wireless communication range of action FIG. 106. In the scenario of FIG. 2A, user device 104 and action FIG. 106 may establish a wireless connection with one another through which the two devices may directly communicate with one another. Additionally, or alternatively, user device 104 and accessory 108 may establish a wireless connection with one another through which the two devices may directly communicate with one another.

In another scenario, accessory 108 may provide information to user device 104 (or to a host of an associated virtual environment) by transmitting the information to action FIG. 106 via a wireless connection established between action FIG. 106 and accessory 108. Upon receipt of the information, action FIG. 106 may transmit the information to user device 104 via a wireless connection established between user device 104 and action FIG. 106. Accessory 108 may also receive information from user device 104 through action FIG. 106. In yet another other scenario, the roles of action FIG. 106 and accessory 108 may be swapped such that user device 104 and accessory 108 may be within each other's respective wireless communication ranges, and accessory 108 may relay information from action FIG. 106 to user device 104 or from user device 104 to action FIG. 106.

In yet another scenario, one or more action FIG. 106 may act as intermediaries between (i) one or more other action FIG. 106 (or their accessories 108) and (ii) user device 104 (or a host of an associated virtual environment). As an example, user device 104 may not support enough wireless connections at a given time. As such, one or more action FIG. 106 may act as intermediaries to limit the number of wireless connections with user device 104. If, for example, an "army" of action FIG. 106 is used during gameplay, one or more action FIG. 106 may act as intermediaries and establish wireless connections with user device 104 and other action FIG. 106. Thus, the receipt and transmission to/from the other action FIG. 106 may be performed through the intermediary action FIG. 106.

Figure 2B:
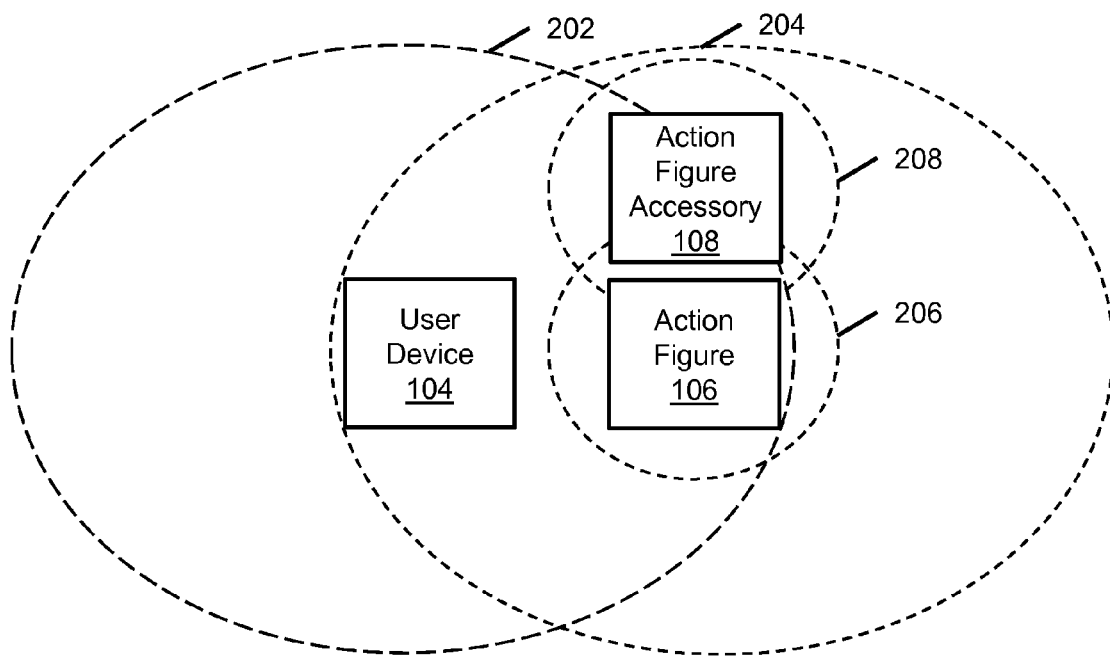

In a further scenario, with respect to FIG. 2B, area 202 may correspond to a Bluetooth communication range of user device 104, and area 204 may correspond to a Bluetooth communication range of action FIG. 106. Area 206 may correspond to an NFC communication range of action FIG. 106, and area 208 may correspond to an NFC communication range of accessory 108. As an example, user device 104 and action FIG. 106 may establish a Bluetooth communication session with one another through which the two devices may directly communicate with one another. Action FIG. 106 and accessory 108 may establish an NFC communication session with one another through which the two devices may directly communicate with one another.

It should be noted that, although some implementations described herein are with respect to wireless communications between one or more components of system 100, it is understood that (to the extent possible) communications between the components of system 100 may be performed via one or more wired means. For example, server 102, user device 104, action FIG. 106, accessory 108, or other components of system 100 may be directly connected to one another via a Universal Serial Bus (USB) connection, an Ethernet connection, or other wired means.

In an implementation, after a wireless connection between user device 104 and action FIG. 106 is established, virtual interface subsystem 132 may receive action figure state or behavior information from action FIG. 106 via the established wireless connection. The received action figure state or behavior information may, for example, comprise information identifying a state or behavior of action FIG. 106, a state or behavior of accessory 108 of action FIG. 106, a state or behavior of one or more other action figures or their respective accessories 108, or other state or behavior. As described herein elsewhere, the action figure state or behavior information may be generated (or otherwise obtained) by action FIG. 106 based on (i) sensor information obtained via one or more sensors of action FIG. 106, (ii) state or behavior information related to virtual counterparts, (iii) information from accessories 108, (iv) information from other action FIG. 106, or (v) other information.

Virtual interface subsystem 132 may be programmed to provide the action figure state or behavior information to virtual environment subsystem 112. Based on the action figure state or behavior information, virtual environment subsystem 112 may work with virtual counterpart subsystem 114 or virtual action management subsystem 116 to cause one or more virtual counterparts of action FIG. 106, the other action FIG. 106, or their respective accessories 108 to exhibit one or more corresponding states or behaviors in a virtual environment. Additionally, or alternatively, virtual environment subsystem 112 may cause the virtual environment to exhibit one or more aspects based on the action figure state or behavior information. A presentation of the virtual counterparts in the virtual environment may be generated and provided to virtual interface subsystem 132. Responsive to receiving the presentation, virtual interface subsystem 132 may provide the presentation of the virtual counterparts and the virtual environment to a user of user device 104 (e.g., via a display electronically coupled to user device 104, via a speaker electronically coupled to user device 104, or other output device).

In an implementation, virtual interface subsystem 132 may receive action figure state information identifying a pose of action FIG. 106 (e.g., from action FIG. 106 via a wireless connection established between user device 104 and action FIG. 106). The state information may, for example, comprise a pose identifier (e.g., which can be used to retrieve information to cause a virtual counterpart of action FIG. 106 to exhibit a corresponding pose), a position of a moveable part of action FIG. 106 relative to another part of action FIG. 106, an orientation of the moveable part of action FIG. 106 relative to another part of action FIG. 106, or other aspects related to the pose of action FIG. 106. Moveable parts of an action figure may comprise the head (or heads), arms, legs, tails, other moveable appendages of the action figure, or other moveable parts.

Virtual interface 132 may provide the state information (identifying the pose of the action figure) to virtual environment subsystem 112. Responsive to providing the state information, virtual interface subsystem 132 may obtain (from virtual environment subsystem 112) a presentation of a virtual counterpart of action FIG. 106 in a virtual environment exhibiting a pose that reflects the pose of action FIG. 106 (e.g., the same pose as action FIG. 106). Virtual interface subsystem 132 may then provide the presentation of the virtual counterpart and the virtual environment to the user.

As an example, upon receipt of the state information, virtual environment subsystem 112 may cause the virtual counterpart to exhibit a pose in the virtual environment that reflects the relative positions and orientations of the moveable parts of action FIG. 106. The state information may identify the relative positions and orientations of the moveable parts of action FIG. 106. Based on the relative positions and orientations, one or more corresponding positions and orientations of the moveable parts of the virtual counterpart may be determined. The moveable parts of the virtual counterpart may then be moved into the corresponding positions and orientations so that the virtual counterpart exhibits a pose that reflects the relative positions and orientations of the moveable parts of action FIG. 106. In one scenario, for example, the head, arms, legs, or other moveable parts of the virtual counterpart may be caused to exhibit relative positions and orientations that correspond to the relative positions and orientations of the head, arms, legs, or other moveable parts of action FIG. 106, respectively (e.g., same or similar relative positions and orientations).

Figure 3A:
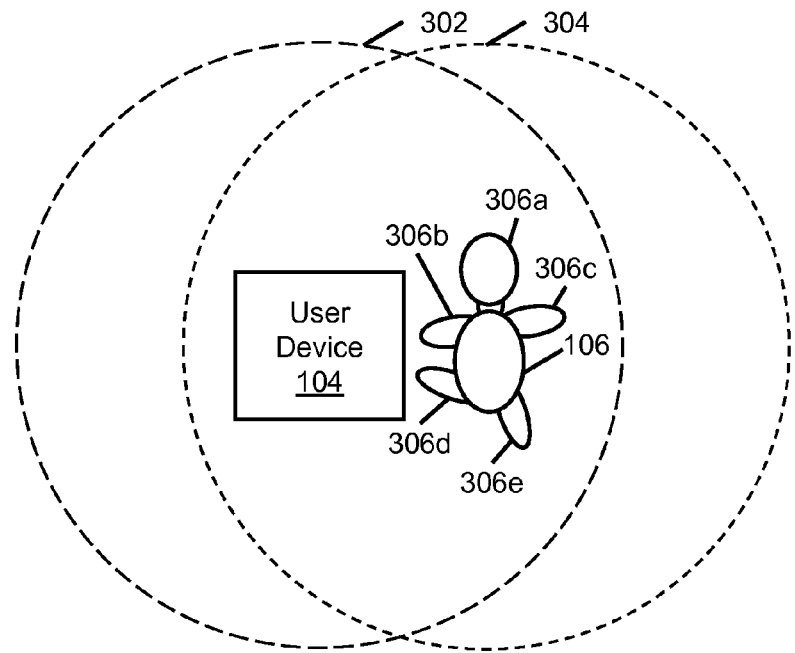
FIGS. 3A and 3B are exemplary illustrations of an action figure in or exhibiting a state or behavior, and a virtual counterpart of the action figure in or exhibiting a corresponding state or behavior in a virtual environment, respectively, in accordance with aspects of the invention.
Figure 3B:
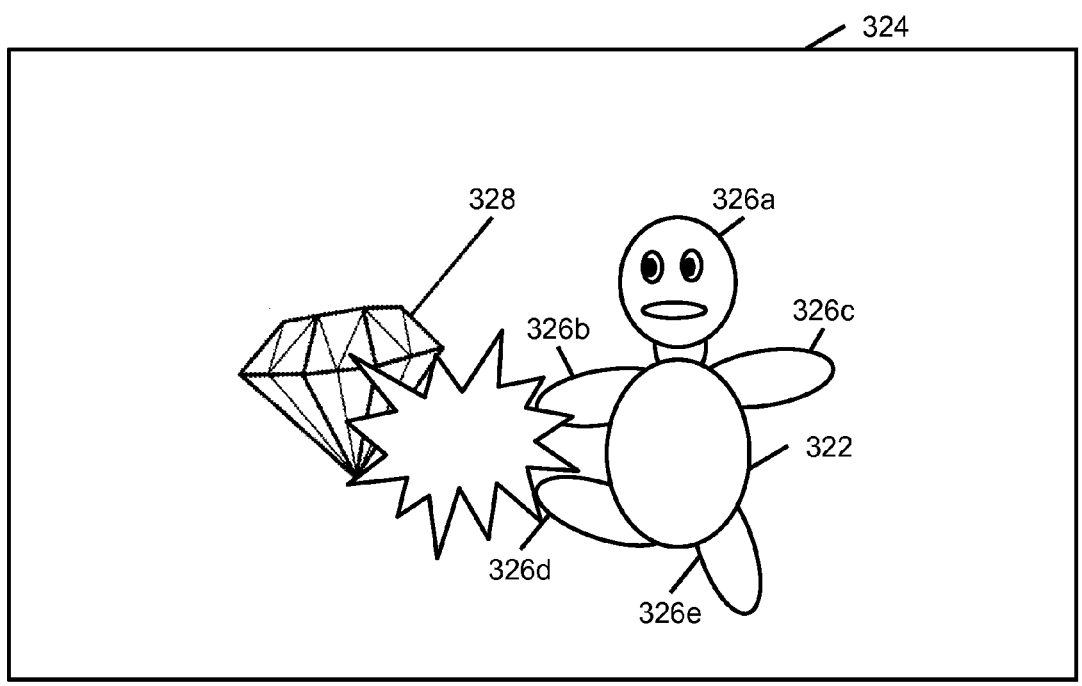

In one use case, with respect to FIGS. 3A and 3B, action FIG. 106 and user device 104 may establish a wireless connection with one another upon detecting each other in their respective wireless communication ranges. As shown in FIG. 3A, action FIG. 106 may be in a pose where its arms 306b and 306c are extended and its leg 306d is extended sideways to appear as if action FIG. 106 is executing a kick. For example, a user may interact with action FIG. 106 by positioning and orienting moveable parts 306a-306e of action FIG. 106 to cause action FIG. 106 to be in the particular pose. Action FIG. 106 may determine that it is currently exhibiting the pose (e.g., based on sensor information obtained via its sensors), and generate state information identifying the pose. The state information may then be transmitted to user device 104 via the established wireless connection. User device 104 may transmit the state information to a host of a virtual environment in which a virtual counterpart 322 of action FIG. 106 exists.

In a further use case, upon receipt of the state information, a host of the virtual environment may cause virtual counterpart 322 to exhibit a pose that reflects the pose of action FIG. 106. As shown in FIG. 3B, a presentation 324 of virtual counterpart 322 exhibiting the same pose as action FIG. 106 may be provided. For example, virtual counterpart 322 may be presented in a pose where its arms 326b and 326c are extended and its leg 326d is extended sideways to appear as if virtual counterpart 322 is executing a kick, which is the same pose exhibited by action FIG. 106.

As another example, upon receipt of the state information (identifying the pose of action FIG. 106), virtual environment subsystem 112 may work with virtual counterpart management subsystem 114 and/or virtual action management subsystem 116 to cause the virtual counterpart of action FIG. 106 to exhibit a virtual action associated with the identified pose in the virtual environment. In one use case, with respect to FIG. 3B, the state information may comprise an identifier of action FIG. 106, information identifying the pose of action FIG. 106, or other information. Virtual counterpart management subsystem 114 may utilize the identifier to identify virtual counterpart 322 as the virtual counterpart corresponding to action FIG. 106. Virtual action management subsystem 116 may utilize the information identifying the pose to identify a kicking action as the virtual action associated with the identified pose (e.g., by querying a virtual action database using the information identifying the pose). Based on the identification of virtual counterpart 322 and the kicking action, virtual environment subsystem 122 may cause virtual counterpart 322 to perform the kicking action in the virtual environment.

In an implementation, virtual interface subsystem 132 may receive action figure state information identifying a state of action FIG. 106 related to an environment of action FIG. 106, and provide the state information to virtual environment subsystem 112 for further processing. As an example, if the state information identifies a current temperature of the action figure, virtual environment subsystem 112 may infer that a current temperature of the environment of action FIG. 106 is a similar to the current temperature of action FIG. 106. To create or maintain a virtual environment that has one or more aspects that correspond to one or more aspects of the environment of action FIG. 106, virtual environment subsystem 112 may cause the virtual environment to exhibit a temperature, scenery, weather, or other aspects of the virtual environment that corresponds to the temperature of action FIG. 106 (e.g., a winter scenery or a snowstorm may correspond to a cold temperature, a sunny scenery or day may correspond to a hot temperature, etc.). Additionally, or alternatively, virtual environment subsystem 112 may cause a virtual counterpart of action FIG. 106 in the virtual environment to exhibit physical attributes, behavioral attributes, mental attributes, or other aspects that correspond to the temperature (e.g., a shivering virtual counterpart may correspond to a cold temperature, a sweating virtual counterpart may correspond to a hot temperature, etc.). A presentation of the virtual counterparts in the virtual environment may be generated and provided to virtual interface subsystem 132. Responsive to receiving the presentation, virtual interface subsystem 132 may provide the presentation of the virtual counterparts and the virtual environment to a user of user device 104.

In an implementation, virtual interface subsystem 132 may receive action figure state information identifying a state of action FIG. 106 related to an accessory of action FIG. 106 (e.g., accessory 108), and provide the state information to virtual environment subsystem 112 for further processing. As an example, action FIG. 106 may detect one of its accessories 108 within proximity (e.g., within a short wireless communication range of action FIG. 106). Based on the detection, action FIG. 106 may generate action figure state information identifying that action FIG. 106 is currently near accessory 108, and provide the state information to virtual environment subsystem 112 (e.g., via virtual interface subsystem 132, a communication session established between action FIG. 106 and server 102, etc.). The state information may, for example, comprise an identifier of action FIG. 106, an identifier of accessory 108, an indication that the two objects are in proximity with one another, or other information. Upon receipt, virtual environment subsystem 112 may process the state information to obtain the identifier of action FIG. 106, the identifier of accessory 108, and the indication of the proximity of the two objects.

Virtual counterpart management subsystem 114 may be programmed to utilize the identifiers of the two objects to determine their respective virtual counterparts, and obtain identifiers of the virtual counterparts or other information regarding the virtual counterparts. Virtual environment subsystem 112 may generate a presentation of the virtual counterparts of action FIGS. 106 and 108 in a virtual environment based on the virtual counterpart identifiers (or the other virtual counterpart information), and provide the presentation of the virtual counterparts to virtual interface subsystem 132. Responsive to receiving the presentation, virtual interface subsystem 132 may provide the presentation of the virtual counterparts and the virtual environment to a user of user device 104.

In an implementation, profile information associated with the virtual counterpart of action FIG. 106 may be updated based on action FIG. 106 being in proximity of accessory 108. As an example, the profile information may be updated to indicate that the virtual counterpart of the action figure has a virtual accessory that corresponds to accessory 108. In one scenario, a user may purchase a sword accessory 108 and activate a virtual sword for use by a virtual character entity that corresponds to action FIG. 106 by placing the sword accessory 108 near action FIG. 106. Action FIG. 106 may, for example, detect the sword accessory 108 for the first time, and wirelessly obtain an identifier of the sword accessory 108 from the sword accessory 108. Action FIG. 106 may provide its identifier, the identifier of the sword accessory 108, and an indication of the proximity of the two objects to virtual environment subsystem 112. In response, virtual environment subsystem 112 may determine whether the sword accessory is valid (e.g., not stolen, not a pirated version, etc.). Upon confirming its validity, virtual environment subsystem 112 may assign the corresponding virtual sword to the virtual character entity (that corresponds to action FIG. 106) by updating the profile information associated with the virtual character entity to indicate that the virtual sword belongs to the virtual character entity. Based on the assignment, the virtual character entity may be presented in the virtual environment with the virtual sword.

In an implementation, responsive to receiving action figure state information identifying a state of action FIG. 106, virtual environment subsystem 112 may select, based on the state of action FIG. 106, one or more characteristics for a virtual environment, a virtual counterpart of action FIG. 106 in the virtual environment, a virtual counterpart of accessory 108 of action FIG. 106 in the virtual environment, one or more virtual counterparts of other action FIG. 106 or accessories 108 in the virtual environment, or other virtual objects in the virtual environment. Virtual environment subsystem 112 may then cause the virtual environment (e.g., an area of the virtual environment, the virtual environment as a whole, etc.), the virtual counterpart of action FIG. 106 in the virtual environment, the virtual counterpart of accessory 108 of action FIG. 106 in the virtual environment, the virtual counterparts of other action FIG. 106 or accessories 108 in the virtual environment, or the other virtual objects in the virtual environment to exhibit the selected characteristics. The selected characteristics may comprise one or more appearance-related characteristics (e.g., colors, size, etc.), modes (e.g., attack mode, defense mode, accuracy mode, rapid fire mode, recharge mode, healing mode, etc.), or other characteristics.

As an example, the state of action FIG. 106 may comprise a pose of action FIG. 106 (e.g., a position of a moveable part of action FIG. 106 relative to another part of action FIG. 106, an orientation of the moveable part of action FIG. 106 relative to another part of action FIG. 106, or other aspects related to the pose of action FIG. 106). In one use case, for example, the pose of action FIG. 106 may comprise the arms of action FIG. 106 intersecting with one another across the body of action FIG. 106. Based on the crossed arms, virtual environment subsystem 112 may select a defense mode (from a plurality of virtual counterpart modes) for the virtual counterpart of action FIG. 106, and cause the virtual counterpart of action FIG. 106 to be in the defense mode. While in defense mode, the virtual counterpart of action FIG. 106 may, for example, take 20% less damage (or other reduction of damage) than usual when attacked (e.g., as compared to when the virtual counterpart of action FIG. 106 is in "normal" mode). In another use case, based on the crossed arms (or other pose), virtual counterpart environment subsystem 112 may select a rapid fire mode for the virtual counterpart of accessory 108 of action FIG. 106, and cause the virtual counterpart of accessory 108 of action FIG. 106 to be in the rapid fire mode. While in rapid fire mode, the virtual counterpart of accessory 108 of action FIG. 106 may, for example, be enabled to fire at twice the usual rate (or other firing rate increase) (e.g., as compared to when the virtual counterpart of accessory 108 is in normal mode).

As another example, the state of action FIG. 106 may be related to accessory 108 of action FIG. 106 (e.g., a position of accessory 108 (or parts thereof) relative to action FIG. 106, an orientation of accessory 108 (or parts thereof) relative to action FIG. 106, etc.). In one use case, for example, action FIG. 106 may comprise a military soldier figure, and accessory 108 may comprise a gun. When the gun is positioned on the shoulder of the military soldier figure, virtual environment subsystem 112 may utilize the relative position of the gun to select an accuracy mode for a virtual counterpart of the gun (e.g., a corresponding virtual gun), and cause the virtual counterpart of the gun to be in the accuracy mode (e.g., causing the virtual gun to have a higher accuracy of hitting a target). On the other hand, when the gun is positioned below the shoulder of the military solider figure (e.g., against the military soldier figure's sides), virtual environment subsystem 112 may utilize the relative position of the gun to select a rapid fire mode for the virtual counterpart of the gun, and cause the virtual counterpart of the gun to be in the rapid fire mode (e.g., causing the virtual gun to have a higher firing rate). In another use case, when the muzzle of the gun is oriented upward (e.g., the gun is vertically in parallel with the military solider figure's body and the muzzle is pointing toward the relative direction of the military solider figure's head), virtual environment subsystem 112 may utilize the relative orientation of the gun to select a recharge mode for the virtual counterpart of the gun, and cause the virtual counterpart of the gun to be in the recharge mode (e.g., causing the virtual gun's ammunition to be increased).

In an implementation, virtual interface subsystem 132 may receive action figure behavior information identifying a behavior of action FIG. 106, and provide the behavior information to virtual environment subsystem 112 for further processing. As an example, the behavior information may identify one or more movements exhibited by one or more moveable parts of action FIG. 106. Based on a processing of the behavior information, virtual environment subsystem 112 may work with virtual counterpart management subsystem 144 and/or virtual action management subsystem 116 to determine one or more actions (e.g., a fireball attack or other action) that correspond to the identified movements. Virtual environment subsystem 112 may then cause the virtual counterpart to execute the corresponding actions in a virtual environment. A presentation of the virtual counterpart exhibiting the corresponding actions and the virtual environment may be provided to a user of user device 104.

In one scenario, with respect to FIGS. 3A and 3B, a user may quickly move leg 306d of action FIG. 106 upward about 90 degrees. Virtual environment subsystem 112 may receive, from action FIG. 106, behavior information identifying this upward 90 degree rotation of leg 306d. Based on the behavior information, virtual action management subsystem 116 may determine an action corresponding to the upward 90 degree leg rotation that is to be executed by virtual counterpart 322. The corresponding action may, for example, comprise a kicking action executable by virtual counterpart 322. As shown, virtual counterpart 322 may execute the kicking action on a virtual object (e.g., a hidden treasure chest) to unveil a hidden virtual object 328 (e.g., a diamond).

In an implementation, a set of predefined actions that can be executed by one or more virtual counterparts may be stored in a database. As an example, the predefined actions may be stored in association with one or more states or behaviors of action figures (e.g., poses of the action figures, movements of the action figures, etc.). When a state or behavior of an action figure is determined, the state or behavior may be utilized as input to query the database to determine at least one predefined action associated with the state or behavior. A virtual counterpart of the action figure may then be caused to execute the predefined action in the virtual environment.

In an implementation, responsive to receiving action figure behavior information identifying a behavior of action FIG. 106, virtual environment subsystem 112 may select, based on the behavior of action FIG. 106, one or more characteristics for a virtual environment, a virtual counterpart of action FIG. 106 in the virtual environment, a virtual counterpart of accessory 108 of action FIG. 106 in the virtual environment, one or more virtual counterparts of other action FIG. 106 or accessories 108 in the virtual environment, or other virtual objects in the virtual environment. Virtual environment subsystem 112 may then cause the virtual environment (e.g., an area of the virtual environment, the virtual environment as a whole, etc.), the virtual counterpart of action FIG. 106 in the virtual environment, the virtual counterpart of accessory 108 of action FIG. 106 in the virtual environment, the virtual counterparts of other action FIG. 106 or accessories 108 in the virtual environment, or the other virtual objects in the virtual environment to exhibit the selected characteristics. The selected characteristics may comprise one or more appearance-related characteristics (e.g., colors, size, etc.), modes (e.g., attack mode, defense mode, accuracy mode, rapid fire mode, recharge mode, healing mode, etc.), or other characteristics.

In an implementation, virtual interface subsystem 132 may receive action figure state information identifying a position of a first action FIG. 106 relative to one or more other action FIG. 106, an orientation of the first action FIG. 106 relative to the other action figures, or other aspects of the first action FIG. 106. Responsive to providing the state information to virtual environment subsystem 112, virtual interface 132 may obtain (from virtual environment subsystem 112) a presentation of a first virtual counterpart of the first action FIG. 106 and one or more virtual counterparts of the other action FIG. 106 in a virtual environment. As an example, the first virtual counterpart and the other virtual counterparts may be placed in the virtual environment such that their relative positions and orientations in the virtual environment correspond to the relative positions and orientations of the first action FIG. 106 and the other action FIG. 106. In one use case, for example, distances of the first virtual counterpart to the other virtual counterparts in the virtual environment may be to scale in comparison to the distances of the first action FIG. 106 to the other action FIG. 106 in the real-world environment.

Generation/Obtainment of Action Figure State/Behavior Information

In an implementation, action figure state or behavior information may be generated (or otherwise obtained) by an action figure based on sensor information obtained via one or more sensors of the action figure (or other information). The action figure state or behavior information may then be provided to a device via a wireless connection established between the action figure and the device so that the action figure state or behavior information may be utilized to cause a virtual counterpart of the action figure to exhibit a state or behavior in a virtual environment that corresponds to a state or behavior of the action figure. In some implementations, state or behavior information related to an action figure accessory may be generated (or otherwise obtained) by the accessory based on sensor information obtained via one or more sensors of the accessory (or other information). The accessory state or behavior information may be provided to: (i) an action figure (e.g., with which the accessory is associated) via a wireless connection established between the accessory and the action figure; or (ii) one or more other devices via one or more wireless connections between the accessory and the other devices, respectively.

In an implementation, action figure communication subsystem 140 may be programmed to detect a device (e.g., user device 104 or other device) within a short wireless communication range of action FIG. 106. Based on the detection of the device, action figure communication subsystem 140 may be programmed to establish a wireless connection between action FIG. 106 and the device. As an example, action figure communication subsystem 140 may detect one or more user devices 104, other action FIG. 106, accessories 108, or other objects within a short wireless communication range of action FIG. 106, and establish respective wireless connections with the detected objects. After establishing the respective wireless connections, action FIG. 106 and the detected objects may communicate with one another via their respective wireless connections.

In an implementation, sensor subsystem 142 may be programmed to obtain sensor information via one or more sensors of action FIG. 106. The sensors of action FIG. 106 may comprise one or more of magnetic field sensors, accelerometers, gyroscopes, proximity sensors, GPS sensors, impact sensors, water sensors, temperature sensors, cameras, or other sensors. As an example, acceleration force data for each of the three coordinate axes may be obtained from one or more accelerometers. Magnetic field data may be obtained from one or more magnetic field sensors. Rate of rotation data for the three coordinate axes may be obtained from one or more gyroscopes. The acceleration force data and the magnetic field data may be utilized to determine one or more positions, orientations, etc., of action FIG. 106 or parts of action FIG. 106 (e.g., body, moveable appendixes, etc., depending on the locations of the respective sensors) relative to one another, the magnetic North pole, or other point of reference. The acceleration force data and the rate of rotation data may be utilized to determine one or more forward/back motions, up/down motions, left/right motions, pitch motions, yaw motions, roll motions, etc., of action FIG. 106 or parts of action FIG. 106.

As another example, depth/distance information with respect to a distance of action FIG. 106 (or parts thereof) from one or more other objects may be obtained from one or more depth sensing cameras. As another example, wireless signal strength information with regard to one or more signals from one or more other action FIG. 106, accessories 108, user devices 104, or other wireless objects may be obtained from wireless objects (e.g., Bluetooth, NFC, Wi-Fi, etc.) of action FIG. 106. The wireless strength information or other information (GPS data, depth/distance information from depth sensing cameras, etc.) may be utilized to determine a distance of the other wireless objects relative to action FIG. 106 (or parts thereof), a position/location of action FIG. 106 or the other wireless objects, or other information.

Figure 4A:
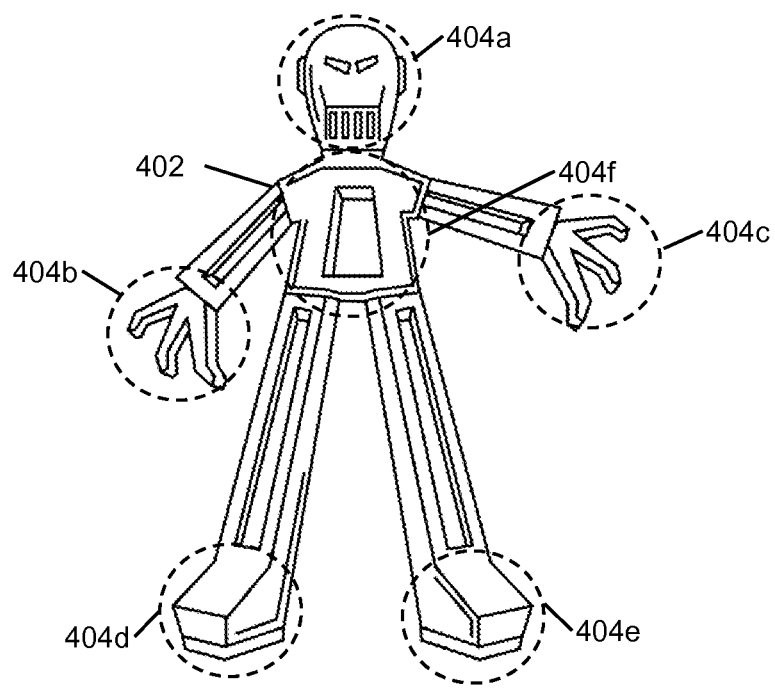
FIGS. 4A and 4B are exemplary illustrations of an action figure and the action figure equipped with action figure accessories, respectively, in accordance with aspects of the invention.

In one use case, with respect to FIG. 4A, action FIG. 402 may be equipped with a set of sensors in one or more of the areas 404a-404f located on at the head, the arms/hands, the legs/feet, and the body, respectively. As an example, each area 404a-404f may comprise a magnetic field sensor, an accelerometer, a gyroscope, or other sensor. Sensor information obtained from sensors in one area 404 may be compared with sensor information obtained from sensors in one or more other areas 404 to determine (i) a position or orientation of one area 404 relative to one or more other areas 404, (ii) a movement of one area 404 relative to one or more other areas 404, or (iii) other information.

Figure 4B:
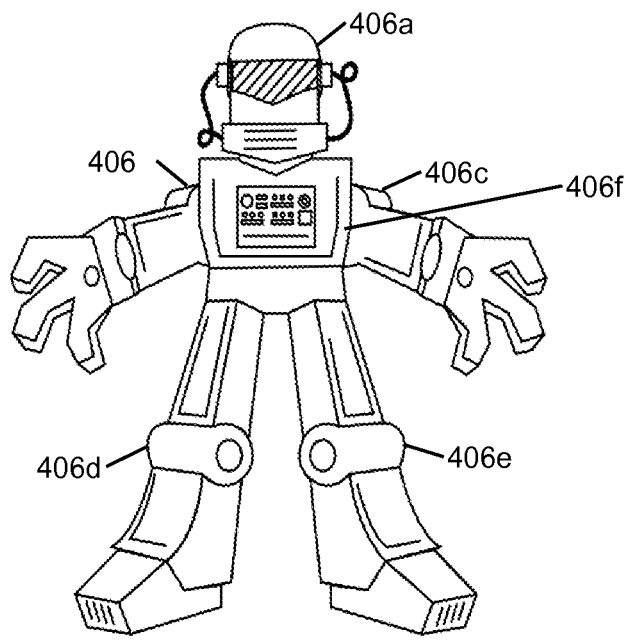

Additionally, or alternatively, with respect to FIG. 4B, one or more accessories 406a-406f may be equipped with sensors, and action FIG. 402 may wireless obtain sensor information from each of the accessories 406a-406f that are equipped with sensors. Because the accessories 406a-406f are designed to be attached to the head, arms/hands, legs/feet, and body, respectively, sensor information obtain from the accessories may be utilized to determine (i) positions or orientations of one part of action FIG. 106 relative to another part of action FIG. 106, (ii) a movement of one part of action FIG. 106 relative to another part of action FIG. 106, or (iii) or other information.

In an implementation, state/behavior management subsystem 144 may be programmed to generate action figure state or behavior information based on sensor information obtained via one or more sensors of action FIG. 106 (or other information). As an example, state/behavior management subsystem 144 may determine a pose of action FIG. 106 (e.g., relative positions and orientations of moveable parts of action FIG. 106) based on the sensor information (e.g., from one or more accelerometers, magnetic field sensors, cameras, or other sensors), and generate state information identifying the pose of action FIG. 106. As another example, state/behavior management subsystem 144 may determine one or more movements performed by one or more moveable parts of action FIG. 106 based on the sensor information (e.g., from one or more accelerometers, gyroscopes, cameras, or other sensors), and generate behavior information identifying the movements of the moveable parts of action FIG. 106.

After generating the action figure state or behavior information, state/behavior management subsystem 144 may be programmed to provide the action figure state or behavior information to virtual interface subsystem 132 via a wireless connection between action FIG. 106 and user device 104 (or to other components via one or more wireless connections between action FIG. 106 and a device hosting the other components, respectively). Virtual environment subsystem 112 may obtain the action figure state or behavior information from virtual interface subsystem 132, and utilize the action figure state or behavior information to cause a virtual counterpart of action FIG. 106 to exhibit a state or behavior in a virtual environment that corresponds to a state or behavior of action FIG. 106.

Figure 5:
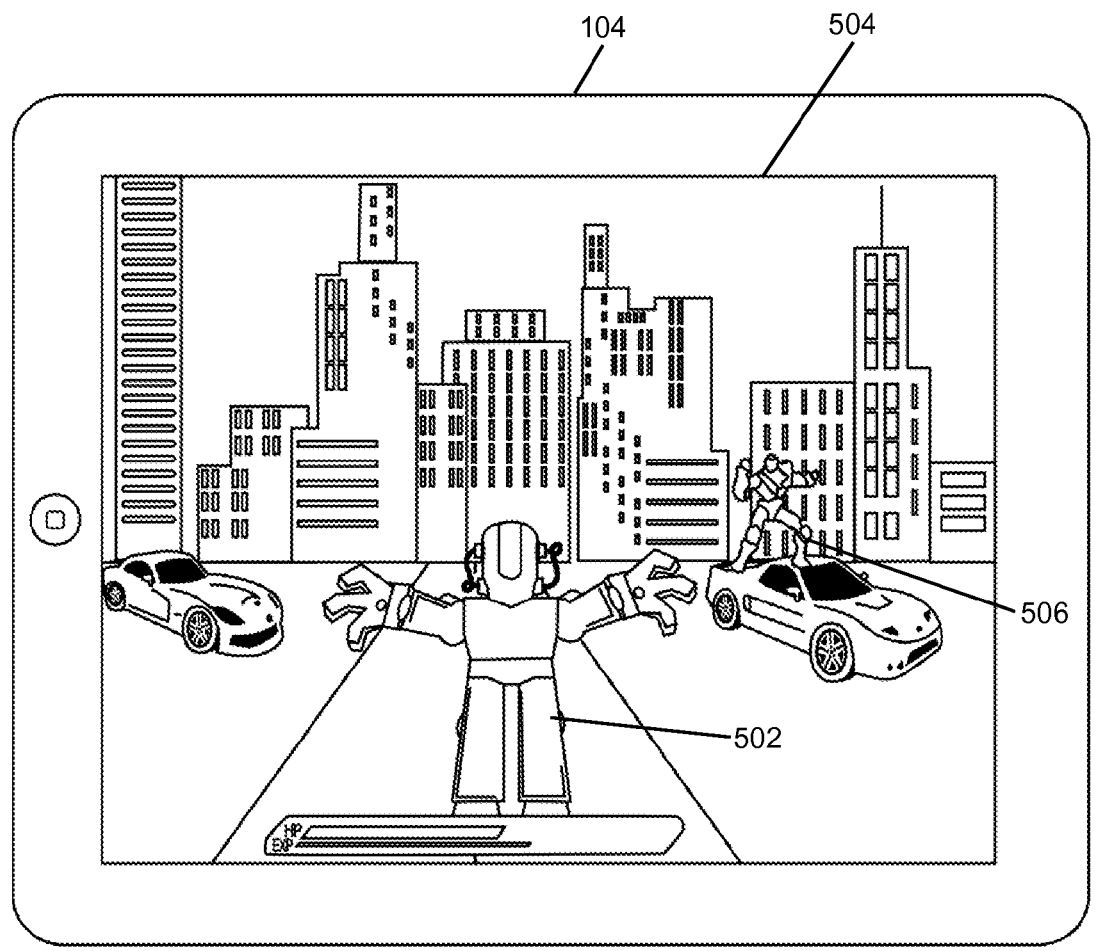
FIG. 5 is an exemplary illustration of a virtual character entity that represents an action figure in a virtual environment getting ready for battle with another virtual character entity, in accordance with an aspect of the invention.

In one scenario, with respect to FIG. 5, action FIG. 402 equipped with accessories 406a-406f may be represented in a virtual environment by virtual counterpart 502 equipped with virtual accessories that correspond to accessories 406a-406f. Poses, actions, or other aspects of virtual counterpart 502 may be controlled by interacting with action FIG. 402 or its accessories 406a-406f. As an example, when a user manipulates the hands and arms of action FIG. 402 such that the hands are at the level of the head of action FIG. 402, state/behavior management utilize sensor information obtained from sensors of action FIG. 406 at the time of the user manipulation to generate state information identifying the positions of the hands and arms relative to the body of action FIG. 402. The state information may subsequently be provided to virtual environment subsystem 112 that utilizes the state information to cause virtual counterpart 502 to exhibit a pose that reflects the relative positions of the hands and arms of action FIG. 402 identified in the state information. As shown in FIG. 5, for example, virtual counterpart is presented in the virtual environment with its hands and arms raised such that the hands are at the level of its head while getting ready to battle another character entity 506.

In an implementation, sensor information obtained from one or more sensors of action FIG. 106 (or other sensors) may comprise movement information related to a movement of action FIG. 106 (or parts thereof). The movement information may, for example, comprise directional information related to a direction of a movement of one or more moveable parts of action FIG. 106, distance information related to a distance covered by the movement of the moveable parts, velocity information related to a velocity of the movement of the moveable parts, acceleration information related to an acceleration of the movement of the moveable parts, orientation information related to an orientation of the moveable parts during the movement of the moveable parts, or other information. In a further implementation, state/behavior management subsystem 144 may generate action figure state or behavior information based on the directional information, the distance information, the velocity information, the acceleration information, the orientation information, or other information.

As an example, the directional information, the distance information, the velocity information, the acceleration information, or the orientation information may be utilized to generate state information identifying a pose of action FIG. 106 (e.g., a pose identifier, positions and orientations of moveable parts relative to a body of action FIG. 106, or other information identifying a pose of action FIG. 106). In one use case, state/behavior management subsystem 144 may utilize a prior pose (or prior positions and orientations of action FIG. 106 or parts thereof) along with the movement information to determine a current pose of action FIG. 106. In another use case, other sensor information (or other information) may be utilized to determine a current pose of action FIG. 106.

As another example, the directional information, the distance information, the velocity information, the acceleration information, or the orientation information may be utilized to generate behavior information identifying one or more predefined movements performed by action FIG. 106 (e.g., predefined gestures, combination of movements by one or more moveable parts, etc.). In one use case, the predefined movements may correspond to one or more actions executable by a virtual counterpart of action FIG. 106 in a virtual environment. For example, upon receipt of behavior information identifying a first predefined movement (e.g., circular rotation of arms of action FIG. 106 or other movement), virtual environment subsystem 112 may cause the virtual counterpart to execute a first action corresponding to the predefined movement (e.g., a fireball attack or other action). A presentation of the virtual counterpart executing the corresponding first action in the virtual environment may be generated and provided to a user of user device 104.

In an implementation, sensor information obtained from one or more sensors of action FIG. 106 (or other sensors) may comprise distance information related to a distance of one or more other objects from action FIG. 106 (or parts thereof). As an example, the distance information may be obtained via one or more cameras (e.g., depth sensing camera system that calculates distances from time of flight information) or other sensors. The distance information may then be utilized to generate state information identifying a state of action FIG. 106 with respect to the other objects, a real-world environment of action FIG. 106, etc. In one scenario, the state information may identify a position or orientation of action FIG. 106 (or parts thereof) relative to the other objects (e.g., other action figures, accessories, etc.) or within the real-world environment (e.g., within a room in which action FIG. 106 is located, an action figure "arena" in which action FIG. 106 is located, etc.). Upon receipt of the state information, virtual environment subsystem 112 may place a virtual counterpart of action FIG. 106 in a virtual environment based on the position or orientation of action FIG. 106 identified by the state information. The virtual counterpart of action FIG. 106 may, for instance, be placed such that the virtual counterpart is located in an area of the virtual environment that corresponds to the identified position within the real-world environment (or relative to the other objects in the real-world environment). A presentation of the virtual counterpart located in the corresponding area of the virtual environment may be generated and provided to a user of user device 104.

Additionally, or alternatively, virtual environment subsystem 112 may place other virtual objects (e.g., virtual counterparts of the other objects in the real-world environment) in the virtual environment based on the position or orientation of action FIG. 106 (relative to the other objects) identified by the state information. The virtual objects may, for instance, be positioned and oriented in the virtual environment with respect to the virtual counterpart of action FIG. 106 such that their positions and orientations in the virtual environment relative to the virtual counterpart of action FIG. 106 reflect their positions and orientations in the real-world environment relative to action FIG. 106. A presentation of the virtual counterpart and the virtual objects in the virtual environment may be generated and provided to a user of user device 104. From the perspective of a user, for instance, distances of the virtual objects from the virtual counterpart of action 106 in the virtual environment may be scaled distances of the objects in the real-world environment.

In an implementation, sensor information obtained from one or more sensors of action FIG. 106 (or other sensors) may comprise physical impact information related to a physical impact on action FIG. 106 (or parts thereof). As an example, the physical impact information may be obtained via one or more impact sensors (e.g., shock detector, impact monitors, etc.) or other sensors. The physical impact information may then be utilized to generate state information identifying a physical shock or impact experienced by action FIG. 106 (or parts thereof), such as an intensity of the shock or impact, a length of the shock or impact, a location of the shock or impact on action FIG. 106, etc. Upon receipt of the state information, virtual environment subsystem 112 may update a state of a virtual counterpart of action FIG. 106 based on the shock or impact experienced by action FIG. 106 so that the updated state of the virtual counterpart reflect damages or other effects to the virtual counterpart corresponding to the occurrence of the shock or impact. As an example, an intensity of a physical shock or impact experienced by action FIG. 106 and a defense attribute (e.g., armor thickness, shield level, etc.) of a virtual counterpart of action FIG. 106 may be utilized to calculate the amount of the health points (or hit points) that is to be deducted from the virtual counterpart to reflect the damage on the virtual counterpart. Additionally, or alternatively, a presentation of one or more events that appear to cause the corresponding damage (or other effects) on the virtual counterpart may be generated and provided to a user of user device 104.

In an implementation, state/behavior management subsystem 144 may obtain state or behavior information identifying one or more (i) states or behaviors of accessories 108, (ii) states or behaviors of other action FIG. 106, or (iii) or other states. As an example, state/behavior management subsystem 144 may obtain information identifying one or more poses, movements, or other aspect of accessories 108, other action FIG. 106, or other objects via one or more wireless connections established between action FIG. 106 and the objects. In one implementation, the state or behavior information related to accessories 108, other action FIG. 106, or other objects may be provided to virtual environment subsystem 112 for further processing.

In another implementation, state/behavior management subsystem 144 may utilize the state or behavior information to generate new or updated state or behavior information identifying a new or updated state or behavior of action FIG. 106. The new or updated state or behavior information may be provided to virtual environment subsystem 112 for further processing. As an example, the new or updated state or behavior information may comprise an identifier of action FIG. 106, one or more identifiers of accessories 108 or other action FIG. 106, an indication that action FIG. 106 is in proximity with the other objects (e.g., accessories 108, other action FIG. 106, etc.), or other information. Upon receipt, virtual environment subsystem 112 may process the new or updated state or behavior information to obtain the identifier of action FIG. 106, the identifiers of accessories 108 or other action figures, and the indication regarding the proximity of action FIG. 106 to the other objects. Based on the proximity indication, the identifiers may be utilized to identify virtual counterparts of the action FIG. 106 and the other objects, and generate a presentation of the virtual counterparts in a virtual environment.

In an implementation, state/behavior management subsystem 144 may utilize state or behavior information related to other objects (e.g., accessories 108, other action FIG. 106, etc.) and sensor information obtained via one or more sensors of action FIG. 106 to generate state or behavior information related to action FIG. 106 (e.g., information identifying a state or behavior of action FIG. 106). As an example, a virtual counterpart of a first action FIG. 106 in a virtual environment may have the ability to perform a summoning technique (or other action) when other virtual counterparts of certain other action FIG. 106 are arranged in a particular way with respect to the virtual counterpart of the first action FIG. 106 (e.g., a circular arrangement where the virtual counter parts are facing the center of the circle and are at most a certain distance apart from another virtual counterpart). Virtual environment subsystem 112 may cause the virtual counterparts to be arranged in such a manner in the virtual environment when it determines that the first action FIG. 106 and the other action FIG. 106 are arranged in a corresponding manner in the real-world environment.

The foregoing determination regarding the arrangement of the action FIG. 106 may be obtained from at least one of the action FIG. 106 (e.g., the first action FIG. 106). For example, sensor subsystem 142 may obtain distance information obtained via one or more cameras (or other sensors) of the first action FIG. 106 that is related to distances of the other action FIG. 106 from the first action FIG. 106 and/or one another. State/behavior management subsystem 144 may obtain state information from the other action FIG. 106 that comprises identifiers of the other action FIG. 106, the poses of the other action FIG. 106, or other information (e.g., via wireless connections established between the first action FIG. 106 and the other action FIG. 106). State/behavior management subsystem 144 may then utilize the distance information and the state information related to the other action FIG. 106 to generate state information identifying the positions and orientations of the action FIG. 106 relative to one another. Virtual environment subsystem 112 may obtain the generated state information, and process the generated state information to determine the manner in which the action FIG. 106 are arranged in the real-world environment. Based on the arrangement of the action FIG. 106, virtual environment subsystem 112 may cause the virtual counterparts of the action FIG. 106 to be arranged in a corresponding manner in the virtual environment (e.g., an arrangement that enables the virtual counterpart of the first action FIG. 106 to perform a particular summoning technique).

In an implementation, state/behavior management subsystem 144 may obtain information related to a virtual counterpart of action FIG. 106, and utilize the virtual counterpart information to generate action figure state or behavior information. For example, user device 104 may obtain the virtual counterpart information from virtual environment subsystem 112, and provide the virtual counterpart information to state/behavior management subsystem 144 via a wireless connection established between action FIG. 106 and user device 104. The virtual counterpart information may identify a state or behavior of the virtual counterpart of action FIG. 106. Upon receipt of the virtual counterpart information, state/behavior management subsystem 144 may utilize the state or behavior of the virtual counterpart to update a state of action FIG. 106 (e.g., updating a current state of action FIG. 106 such that the current state corresponds to a current state of the virtual counterpart). The updated state of action FIG. 106 may be utilized to generate and provide action figure state or behavior information (e.g., updated or new information) to virtual environment subsystem 112 for further processing (e.g., to cause the virtual counterpart of action FIG. 106 to exhibit a new state or behavior, to update a state of the virtual counterpart or the virtual environment, etc.). As an example, (i) sensor information obtained via one or more sensors of action FIG. 106, (ii) state or behavior information identifying a state or behavior of other objects (e.g., accessories 108, other action FIG. 106, etc.) obtained via a wireless connection established between action FIG. 106 and the other objects, or (iii) other information may be utilized along with the updated state of action FIG. 106 to generate the action figure state or behavior information.

Notifications and Related Presentations at Action Figures/Accessories

In an implementation, an action figure or action figure accessory may obtain notifications based on one or more push protocols, pull protocols, or other protocols. As an example, upon detecting a communication device (from which a notification may be provided) within a short wireless communication range, action figure or action figure accessory may establish a wireless connection between the action figure or accessory and the communication device. When the wireless connection is established, notifications may be obtained via the wireless connection. After obtaining a notification, the action figure or action figure accessory may provide a presentation of information in the notification, an indication related to the notification, or other presentation. As such, relevant information may be provided to a user through the action figure or action figure accessory so that the user need not necessarily utilize another device to obtain such information.

In some implementations, the action figure or accessory may utilize information transmitted via such notifications to update information stored at the action figure or accessory. As an example, a notification may comprise information related to a virtual counterpart of the action figure or accessory, and the virtual counterpart information may be utilized to update a current state of the action figure or accessory.

In an implementation, action figure communication subsystem 140 may be programmed to receive a notification comprising information related to (i) action FIG. 106, (ii) a virtual counterpart of action FIG. 106 in a virtual environment, (iii) the virtual environment, or (iv) a user account associated with an owner of action FIG. 106. Based on an initial processing of the notification, action figure communication subsystem 140 may provide the notification to state/behavior management subsystem 144, presentation subsystem 146, or other subsystem. As an example, action figure communication subsystem 140 may perform the initial processing of the notification to determine an appropriate subsystem to perform further processing of the notification, and provide the notification to another subsystem in accordance with its determination.

In an implementation, upon being provided a notification, presentation subsystem 146 may be programmed to process the notification to obtain information related to (i) action FIG. 106, (ii) a virtual counterpart of action FIG. 106 in a virtual environment, (iii) the virtual environment, or (iv) a user account associated with an owner of action FIG. 106. After obtaining the related information, presentation subsystem 146 may present the related information at action FIG. 106 (e.g., via a display electronically coupled to action FIG. 106, via a speaker electronically coupled to action FIG. 106, or other output device). The presentation of the related information may comprise an auditory presentation, a visual presentation (e.g., image, animation, video, etc.), a haptic presentation, or other presentation.

In an implementation, presentation subsystem 146 may be programmed to present information (obtained via a notification) at action FIG. 106 based on a detection of a user interaction with action FIG. 106. As an example, although the information may be obtained by presentation subsystem 146 and available for presentation, the information may not be presented until at least the user interaction is detected. The detected user interaction may comprise a press or other interaction with a button/switch on action FIG. 106, a voice command, one or more predefined movements of action FIG. 106 (or one or more moveable parts thereof (e.g., moveable appendixes)), or other user interaction.

In one use case, information identifying a current health status, power level, or other aspect of a virtual counterpart of a first action FIG. 106 in a virtual environment may be provided as part of a notification transmitted to the first action FIG. 106. Upon obtaining the information, one or more indicators (e.g., a light indicator, an audio indicator, etc.) next to a button on the first action FIG. 106 may be activated to alert a user that information is available for presentation. When the user presses the button, the information may be presented on a display on the first action FIG. 106 (e.g., "The health of [Virtual Counterpart X] is dangerously low! You can purchase a healing portion to increase its health").

In another use case, information identifying an event that is occurring (or is to occur) in a virtual environment (e.g., in which a virtual counterpart of a first action FIG. 106 resides) may be provided as part of a notification transmitted to the first action FIG. 106 to alert the user of the event. As an example, upon detection of user interaction with the first action FIG. 106, the event information may be presented on a display on the first action figure (e.g., "For the next five hours!!! Battle the Crimson General and receive 2× HP!!!"). Other information, such as activation status of the first action FIG. 106, an update to the first action FIG. 106 (e.g., updated capabilities of the first action FIG. 106, an updated name of the first action FIG. 106, etc.), a name of an area in the virtual environment at which the virtual counterpart is currently located, sale of action figures corresponding to virtual counterparts in the virtual environment (e.g., 1-day, 1-week, or other timed sale of such action figures), an opponent battle request for a battle in the virtual environment, a current level of the user (or owner of the first action FIG. 106) with respect to a game related to the virtual environment, charges to an account of the user, etc., may of course be provided as part of a notification and/or presented in the same or different manner. Additionally, or alternatively, other information that may not be related to the first action FIG. 106, the virtual counterpart of the first action FIG. 106, the virtual environment, or a user account associated with an owner of the first action FIG. 106 may of course be provided as part of a notification and/or presented in the same or different manner (e.g., notification of unrelated news, events, or other information).

Figure 6A:
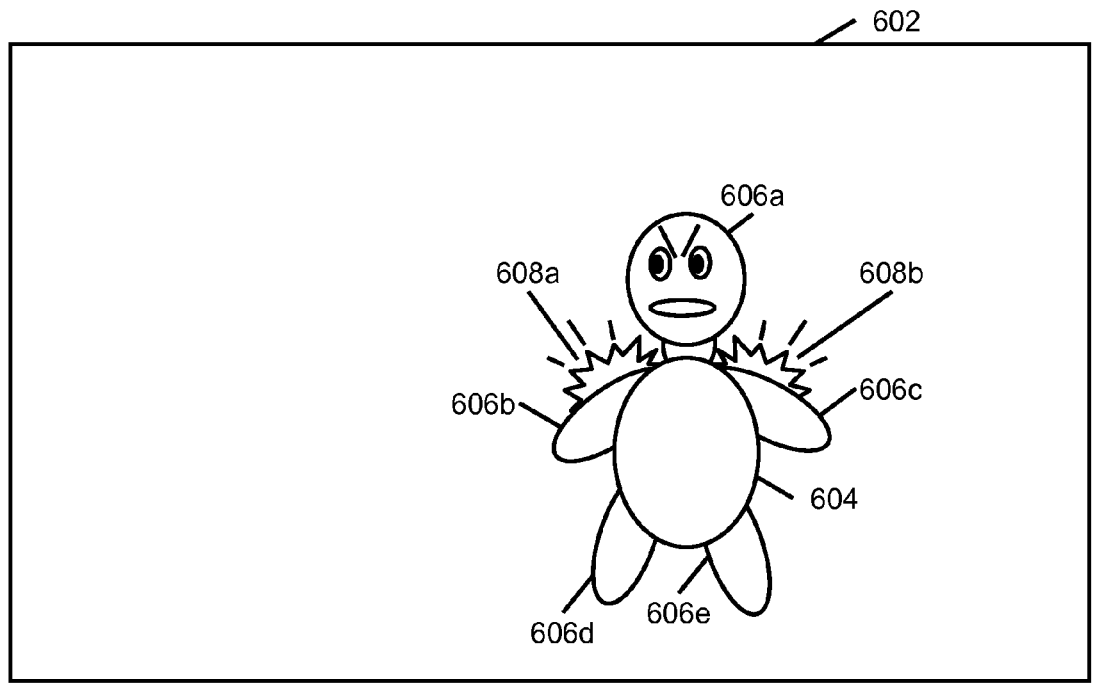
FIGS. 6A and 6B are exemplary illustrations of a virtual counterpart of an action figure in or exhibiting a state or behavior in a virtual environment, and the action figure in or exhibiting a corresponding state or behavior, respectively, in accordance with aspects of the invention.
Figure 6B:
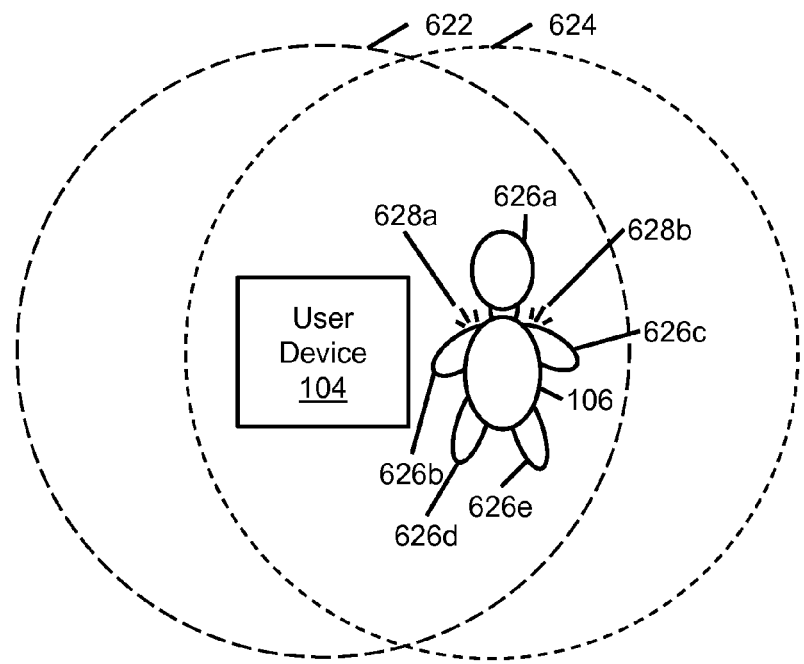

In an implementation, state/behavior management subsystem 144 may be programmed to update a state of action FIG. 106 based on information obtained via a notification. As an example, the obtained information may comprise information related to a state of a virtual counterpart of action FIG. 106 in a virtual environment. State/behavior management subsystem 144 may utilize the related information to update the state of action FIG. 106 to reflect the state of the virtual counterpart. In one scenario, with respect to FIG. 6A, virtual counterpart 604a may have reached a level that causes light or other energy to visually emanate from moveable parts 606b and 606c of virtual counterpart 604. A notification comprising an indication to update a current state of action FIG. 106 to reflect an "activated" status for light indicators 628a and 628b on moveable parts 626b and 626c of action FIG. 106. Upon updating the current state of action figure, the activated status for light indicators 628a and 628b may be stored in a non-volatile memory (e.g., flash memory or other non-volatile memory). As such, as shown in FIG. 6B, when action FIG. 106 is powered, light indicators 628a and 628b may be in an "on" state to reflect the state of the virtual counterpart (e.g., where light or other energy visually emanates from moveable parts 606b and 606c of virtual counterpart 604).

In an implementation, when a notification comprising information related to a virtual accessory of a virtual counterpart of action FIG. 106 is received, state/behavior management subsystem 144 may be programmed to provide, based on the related information, an indication of a state of the virtual accessory to an accessory 108 of action FIG. 106 that corresponds to the virtual accessory. As an example, state/behavior management subsystem 144 may process the related information to determine the state of the virtual accessory, and provide the indication of the state of the virtual accessory to accessory 108. Responsive to being provided the indication of the state of the virtual accessory, the indication may be presented at accessory 108.

In one use case, responsive to a user purchasing an upgrade to the virtual accessory that modifies one or more physical aspects of the virtual accessory, virtual environment subsystem 112 may provide state information comprising an identifier of accessory 108, the modified aspects of the virtual accessory, or other information to action FIG. 106. Based on a processing of the state information, state/behavior management subsystem 144 may determine (i) the modified aspects of the virtual accessory and (ii) accessory 108 as an intended recipient of the state information. State/behavior management subsystem 144 may then provide an indication of the modified aspects to accessory 108 (e.g., via a wireless connection established between action FIG. 106 and accessory 108). Upon providing the indication, the indication of the modified aspects may be presented at accessory 108 (e.g., a text identifying the upgrade may be presented on a display of accessory 108).

In another use case, responsive to a user purchasing an upgrade to the virtual accessory that modifies one or more physical aspects of the virtual accessory, virtual environment subsystem 112 may provide state information comprising an identifier of accessory 108, an indication to update a state of accessory 108 to reflect the modification, or other information to action FIG. 106. Based on a processing of the state information, state/behavior management subsystem 144 may provide the indication of the update to accessory 108. Upon providing the indication, accessory 108 may update the state of accessory 108 to reflect the modification. The updated state may be stored by accessory 108 in a non-volatile memory of accessory 108. In a further use case, the updated state may cause one or more indicators at accessory 108 related to the physical aspects of the virtual accessories to reflect the modification. For example, when powered, certain light indicators on accessory 108 may be activated so that accessory 108 displays physical aspects that corresponds to the modified physical aspects of the virtual accessory (e.g., a green, red, and blue light pattern may be displayed on accessory 108 if the modified physical aspects of the virtual accessory comprises a green, red, and blue color pattern).

In an implementation, state/behavior management subsystem 144 (of action FIG. 106) may be programmed to receive a notification related to a virtual counterpart of another action FIG. 106. The notification may comprise an identifier of the other action FIG. 106, state information identifying a state of the virtual counterpart of the other action FIG. 106, an update for the other action FIG. 106 that is related to the state of the virtual counterpart, or other information. Based on the identifier of the other action FIG. 106, state/behavior management subsystem 144 may provide the state information, the update for the other action FIG. 106, or other information (of the notification) to the other action FIG. 106. Upon providing the state information, an indication of the state of the virtual counterpart may be presented at the other action FIG. 106. Additionally, or alternatively, upon providing the update, a state of the other action figure may be updated, and the updated state may be stored in a non-volatile memory of the other action FIG. 106.

Exemplary Data Flow

Figure 7:
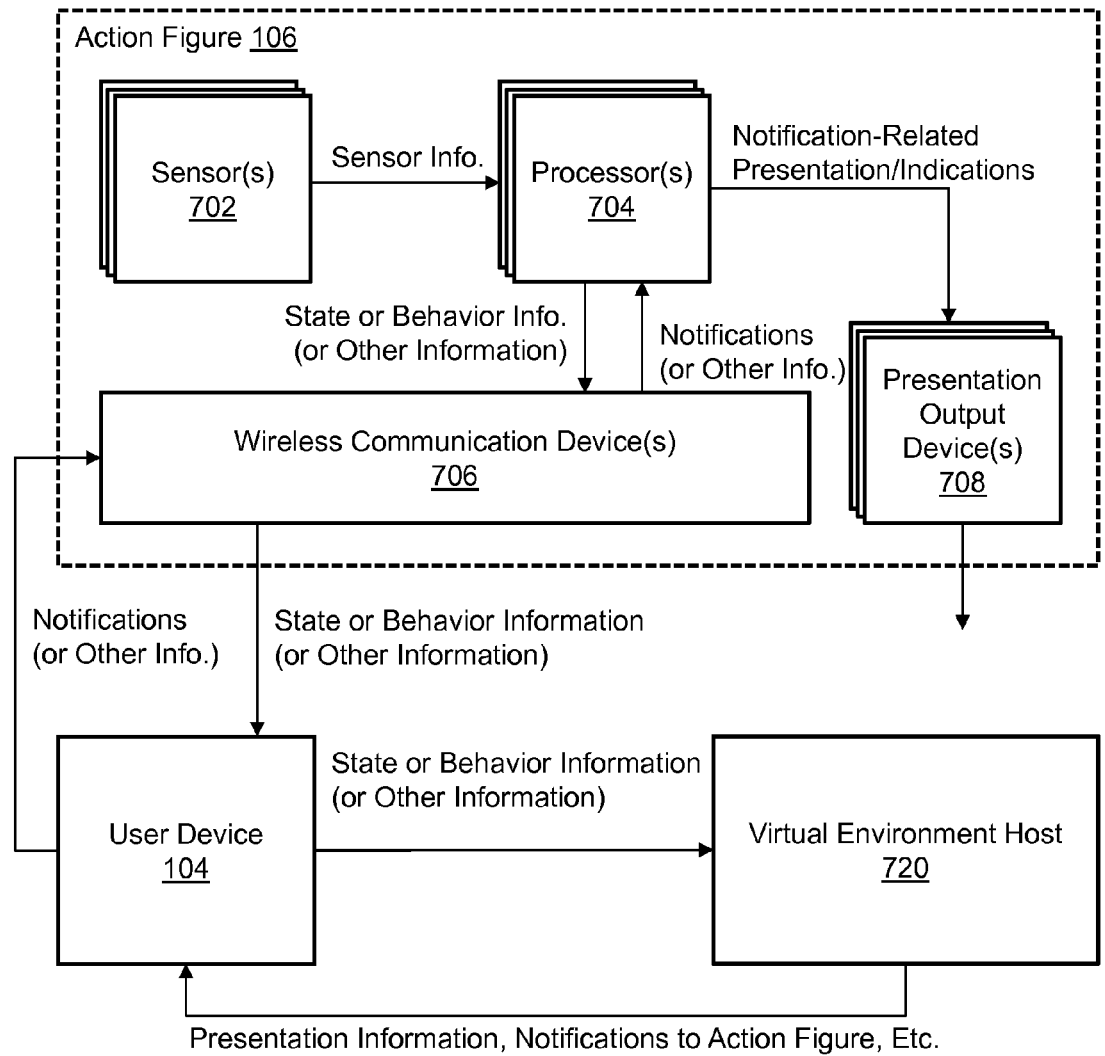
FIG. 7 is an exemplary illustration of a data flow related to providing interactive action figures or action figure accessories that have corresponding virtual counterparts in a virtual environment, in accordance with an aspect of the invention.

FIG. 7 is an exemplary illustration of a data flow related to providing interactive action figures or action figure accessories that have corresponding virtual counterparts in a virtual environment, in accordance with an aspect of the invention.

As an example, with respect to FIG. 7, sensor information collected by sensor(s) 702 may be provided to processor(s) 704. Processor(s) 704 may utilize the sensor information to generate state or behavior information, and provide the state or behavior information to user device 104 via wireless communication device(s) 706. User device 104 may relay the state or behavior information to virtual environment host 720 that processes the state or behavior information to determine poses, actions, other aspects to be exhibited by a virtual counterpart of action FIG. 106 in a virtual environment. Based on such determinations, virtual environment host 720 may generate a presentation of the virtual counterpart and the virtual environment, and provide the presentation to user device 104 for display to a user of the virtual environment. A virtual environment host may, for example, comprise one or more virtual universe servers, game servers, or other components that host the virtual environment (e.g., a virtual space, a game space, a virtual universe, or other virtual environment).

As another example, with respect to FIG. 7, virtual environment host 720 may provide notifications to action FIG. 106 via user device 104. Processor(s) 704 may process the notifications to generate a presentation (or indications) related to the notifications that provided to a user of the virtual environment via presentation output device(s) 708.

Exemplary Flowcharts

Figure 8:
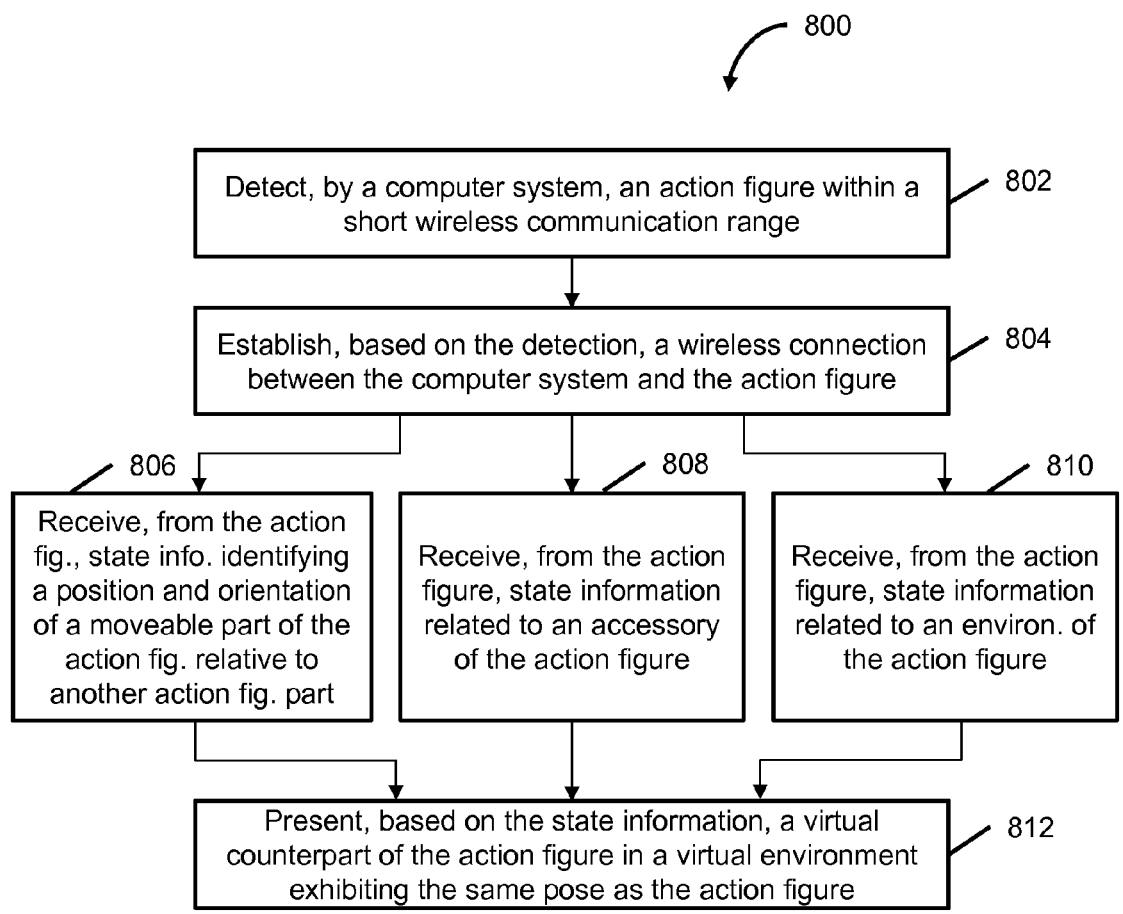
FIG. 8 is an exemplary illustration of a flowchart of a method of providing a presentation of a virtual counterpart of an action figure in a virtual environment based on action figure state information, in accordance with an aspect of the invention.
Figure 9:
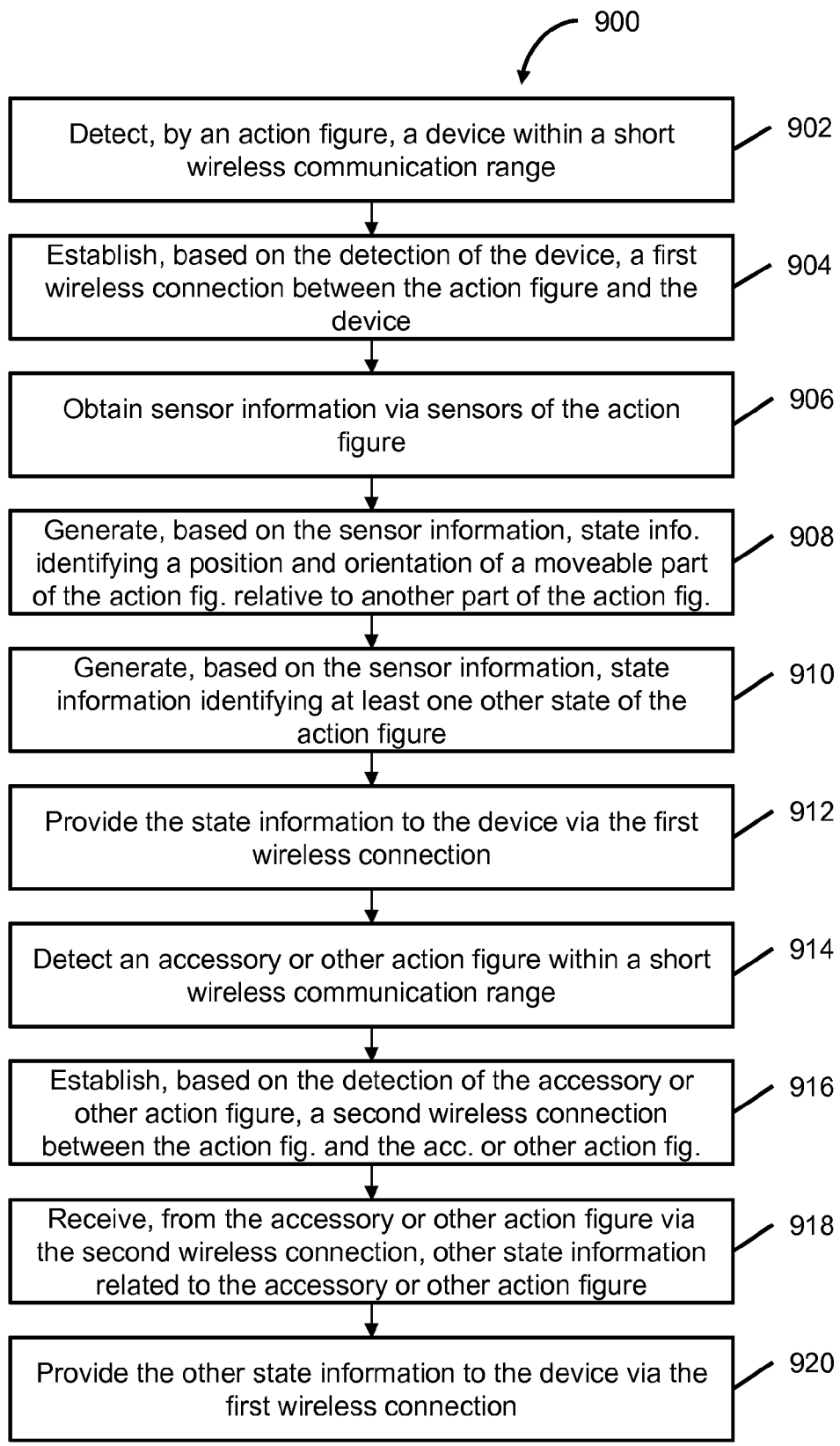
FIG. 9 is an exemplary illustration of a flowchart of a method of providing state information of an action figure via wireless communication, in accordance with an aspect of the invention.
Figure 10:
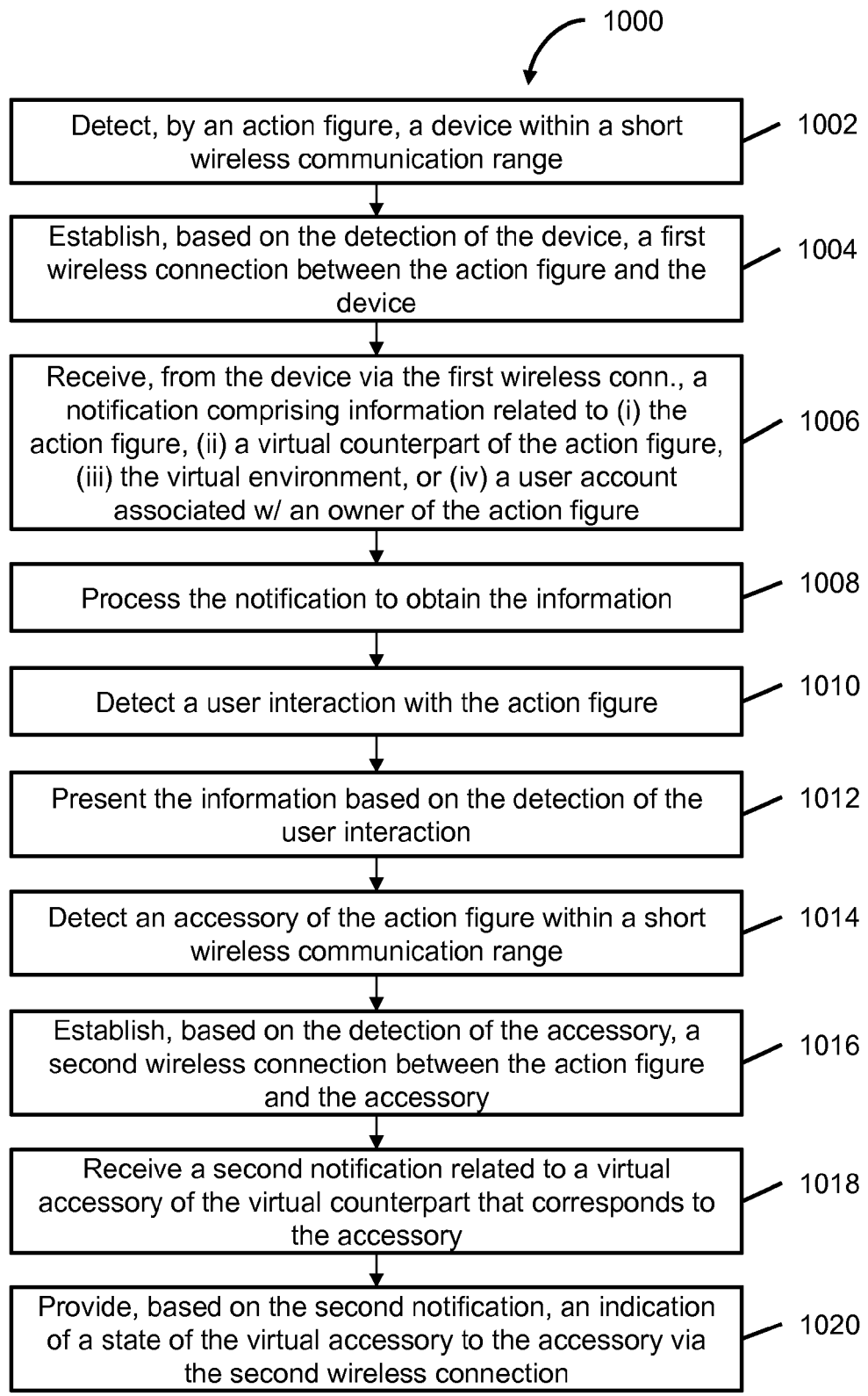
FIG. 10 is an exemplary illustration of a flowchart of a method of providing relevant notifications via an action figure, in accordance with an aspect of the invention.

FIGS. 8-10 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

FIG. 8 is an exemplary illustration of a flowchart of a method 800 of providing a presentation of a virtual counterpart of an action figure based on action figure state information obtained via wireless communication with the action figure, in accordance with an aspect of the invention.

In an operation 802, an action figure may be detected within a short wireless communication range of a computer system. Operation 802 may be performed by a communication subsystem that is the same as or similar to host communication subsystem 110 or interface communication subsystem 130, in accordance with one or more implementations.

In an operation 804, a wireless connection between the computer system and the action figure may be established based on the detection of the action figure. Operation 804 may be performed by a communication subsystem that is the same as or similar to host communication subsystem 110 or interface communication subsystem 130, in accordance with one or more implementations. It should be noted that, although some implementations described herein are with respect to wireless communications between one or more components of system 100, it is understood that (to the extent possible) communications between the components of system 100 may be performed via one or more wired means. As an example, with respect to operation 804, a wired connection may be established between the computer system and the action figure to enable communication between the computer system and the action figure.

In an operation 806, state information identifying a position and orientation of a moveable part of the action figure (relative to another part of the action figure) may be received from the action figure via the established wireless connection. Operation 806 may be performed by a virtual environment subsystem or a virtual interface subsystem that is the same as or similar to virtual environment subsystem 112 or virtual interface subsystem 132, in accordance with one or more implementations.

In an operation 808, state information related to an accessory of the action figure may be received from the action figure via the established wireless connection. Operation 808 may be performed by a virtual environment subsystem or a virtual interface subsystem that is the same as or similar to virtual environment subsystem 112 or virtual interface subsystem 132, in accordance with one or more implementations.

In an operation 810, state information related to an environment of the action figure may be received from the action figure via the established wireless connection. Operation 810 may be performed by a virtual environment subsystem or a virtual interface subsystem that is the same as or similar to virtual environment subsystem 112 or virtual interface subsystem 132, in accordance with one or more implementations.

In an operation 812, a virtual counterpart of the action figure may be presented in a virtual environment based on the state information such that the virtual counterpart is exhibiting the same pose as the action figure. Operation 812 may be performed by a virtual environment subsystem or a virtual interface subsystem that is the same as or similar to virtual environment subsystem 112 or virtual interface subsystem 132, in accordance with one or more implementations.

FIG. 9 is an exemplary illustration of a flowchart of a method 900 of providing state information of an action figure via wireless communication, in accordance with an aspect of the invention.

In an operation 902, a device may be detected within a short wireless communication range of an action figure. Operation 902 may be performed by a communication subsystem that is the same as or similar to action figure communication subsystem 140, in accordance with one or more implementations.

In an operation 904, a first wireless connection between the action figure and the device may be established based on the detection of the device. Operation 904 may be performed by a communication subsystem that is the same as or similar to action figure communication subsystem 140, in accordance with one or more implementations.

In an operation 906, sensor information may be obtained via one or more sensors of the action figure. Operation 906 may be performed by a sensor subsystem that is the same as or similar to sensor subsystem 142, in accordance with one or more implementations.

In an operation 908, state information identifying a position and orientation of a moveable part of the action figure (relative to another part of the action figure) may be generated based on the sensor information. Operation 908 may be performed by a state/behavior management subsystem that is the same as or similar to state/behavior management subsystem 144, in accordance with one or more implementations.

In an operation 910, state information identifying at least one other state of the action figure may be generated based on the sensor information. Operation 910 may be performed by a state/behavior management subsystem that is the same as or similar to state/behavior management subsystem 144, in accordance with one or more implementations.

In an operation 912, the state information (e.g., identifying the pose of the action figure, at least one other state of the action figure, etc.) may be provided to the device via the first wireless connection. Operation 912 may be performed by a state/behavior management subsystem that is the same as or similar to state/behavior management subsystem 144, in accordance with one or more implementations.

In an operation 914, an accessory or other action figure may be detected within a short wireless communication range of the action figure. Operation 914 may be performed by a communication subsystem that is the same as or similar to action figure communication subsystem 140, in accordance with one or more implementations.

In an operation 916, a second wireless connection between (i) the action figure and (ii) the accessory or other action figure may be established based on the detection of the accessory or other action figure. Operation 916 may be performed by a communication subsystem that is the same as or similar to action figure communication subsystem 140, in accordance with one or more implementations. It should be noted that, although some implementations described herein are with respect to wireless communications between one or more components of system 100, it is understood that (to the extent possible) communications between the components of system 100 may be performed via one or more wired means. As an example, with respect to operation 904, a first wired connection may be established between the action figure and the device to enable communication between the action figure and the device. As another example, with respect to operations 916, a second wired connection may be established between the action figure and the accessory to enable communication between the action figure and the accessory.

In an operation 918, other state information related to the accessory or other action figure may be received from the accessory or other action figure via the second wireless connection. Operation 918 may be performed by a state/behavior management subsystem that is the same as or similar to state/behavior management subsystem 144, in accordance with one or more implementations.

In an operation 920, the other state information may be provided to the device via the first wireless connection. Operation 920 may be performed by a state/behavior management subsystem that is the same as or similar to state/behavior management subsystem 144, in accordance with one or more implementations.

FIG. 10 is an exemplary illustration of a flowchart of a method 1000 of providing relevant notifications via an action figure, in accordance with an aspect of the invention.

In an operation 1002, a device may be detected within a short wireless communication range of an action figure. Operation 1002 may be performed by a communication subsystem that is the same as or similar to action figure communication subsystem 140, in accordance with one or more implementations.

In an operation 1004, a first wireless connection between the action figure and the device may be established based on the detection of the device. Operation 1004 may be performed by a communication subsystem that is the same as or similar to action figure communication subsystem 140, in accordance with one or more implementations.

In an operation 1006, a notification may be received from the device via the first wireless connection. The notification may, for example, comprise information related to (i) the action figure, (ii) a virtual counterpart of the action figure in a virtual environment, (iii) the virtual environment, or (iv) a user account associated with an owner of the action figure. Operation 1006 may be performed by a communication subsystem that is the same as or similar to action figure communication subsystem 140, in accordance with one or more implementations.

In an operation 1008, the notification may be processed to obtain the information. Operation 1008 may be performed by a state/behavior management subsystem or a presentation subsystem that is the same as or similar to state/behavior management subsystem 144 or presentation subsystem 146, in accordance with one or more implementations.

In an operation 1010, a user interaction with the action figure may be detected. Operation 1010 may be performed by a state/behavior management subsystem or a presentation subsystem that is the same as or similar to state/behavior management subsystem 144 or presentation subsystem 146, in accordance with one or more implementations.

In an operation 1012, the information may be presented based on the detection of the user interface. Operation 1012 may be performed by a presentation subsystem that is the same as or similar to presentation subsystem 146, in accordance with one or more implementations.

In an operation 1014, an accessory of the action figure may be detected within a short wireless communication range of the action figure. Operation 1014 may be performed by a communication subsystem that is the same as or similar to action figure communication subsystem 140, in accordance with one or more implementations.

In an operation 1016, a second wireless connection between the action figure and the accessory may be established based on the detection of the accessory. Operation 1016 may be performed by a communication subsystem that is the same as or similar to action figure communication subsystem 140, in accordance with one or more implementations. It should be noted that, although some implementations described herein are with respect to wireless communications between one or more components of system 100, it is understood that (to the extent possible) communications between the components of system 100 may be performed via one or more wired means. As an example, with respect to operation 1004, a first wired connection may be established between the action figure and the device to enable communication between the action figure and the device. As another example, with respect to operations 1016, a second wired connection may be established between the action figure and the accessory to enable communication between the action figure and the accessory.

In an operation 1018, a second notification related to a virtual accessory of the virtual counterpart of the action figure may be received. As an example, the virtual accessory may correspond to the accessory of the action figure. The second notification may comprise an identifier of the accessory, an indication of a state of the virtual accessory, or other information. Operation 1018 may be performed by a communication subsystem that is the same as or similar to action figure communication subsystem 140, in accordance with one or more implementations.

In an operation 1020, an indication of the state of the virtual accessory may be provided to the accessory via the second wireless connection. Operation 1020 may be performed by a state/behavior management subsystem that is the same as or similar to state/behavior management subsystem 144, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

What is claimed is:

1. A method of providing a presentation of a virtual counterpart of an action figure based on action figure state information obtained via wireless communication with the action figure, the method being implemented on a computer system that includes one or more physical processors executing computer program instructions which, when executed, perform the method, the method comprising:
    detecting, by the computer system, an action figure within a wireless communication range, wherein the wireless communication range comprises at least one of a Near Field Communication (NFC) range, Bluetooth communication range, or a Wi-Fi communication range;
    establishing, by the computer system, based on the detection, a wireless connection between the computer system and the action figure;
    receiving, at the computer system, from the action figure via the established wireless connection, action figure state information identifying: (i) a position of a moveable part of the action figure relative to another part of the action figure, wherein the relative position of the moveable part is related to a pose exhibited by the action figure; and (ii) an environment-related state of the action figure related to a real-world environment of the action figure based on ambient temperature sensor data acquired by an action figure sensor;
    presenting, by the computer system, a virtual environment, wherein the virtual environment exhibits scenery having one or more aspects corresponding to, and based on, the ambient temperature sensor data; and
    presenting, by the computer system, based on the relative position of the moveable part and the environment-related state, a virtual counterpart of the action figure in the virtual environment, the virtual counterpart having at least one physical or behavioral attribute corresponding to the environment-related state.

2. The method of claim 1, further comprising:
    receiving, at the computer system, action figure state information identifying an orientation of the moveable part of the action figure relative to the other part of the action figure, wherein the relative orientation of the moveable part is related to the pose exhibited by the action figure, and
    wherein presenting the virtual counterpart of the action figure comprises presenting, based on the relative position and the relative orientation, the virtual counterpart of the action figure in the virtual environment having the same pose as the action figure.

3. The method of claim 1, further comprising:
receiving, at the computer system, from the action figure via the established wireless connection, action figure state information identifying a state of the action figure related to a physical impact on the action figure based on impact sensor data; and
wherein presenting the virtual counterpart of the action figure comprises presenting, based on the impact-related state, the virtual counterpart of the action figure in the virtual environment.

4. The method of claim 1, further comprising:
receiving, at the computer system, from the action figure via the established wireless connection, action figure state information identifying a state of the action figure related to an accessory of the action figure,
wherein presenting the virtual counterpart of the action figure comprises presenting, based on the relative position and the accessory-related state, the virtual counterpart of the action figure with a virtual counterpart of the accessory in the virtual environment.

5. The method of claim 4, wherein the virtual counterpart of the action figure comprises a virtual character entity that represents the action figure in the virtual environment, the virtual counterpart of the accessory comprises a virtual accessory of the virtual character entity, and the accessory-related state of the action figure comprises the action figure being in proximity to the accessory of the action figure, the method further comprising:
updating, by the computer system, based on the action figure being in proximity of the accessory of the action figure, profile information associated with the virtual character entity to indicate that the virtual character entity has the virtual accessory,
wherein presenting the virtual counterpart of the action figure comprises presenting, based on the updated profile information, the virtual character entity with the virtual accessory in the virtual environment.

6. The method of claim 4, wherein the accessory-related state comprises one or more of a position of the accessory relative to the action figure or an orientation of the accessory relative to the action figure, and
wherein presenting the virtual counterpart of the action figure with the virtual counterpart of the accessory comprises presenting, based on the relative position of the moveable part and one or more of the relative position of accessory or the relative orientation of the accessory, the virtual counterpart of the action figure with the virtual counterpart of the accessory in the virtual environment.

7. The method of claim 6, wherein presenting the virtual counterpart of the action figure with the virtual counterpart of the accessory comprises presenting one or more of:
(i) the virtual counterpart of the action figure such that the virtual counterpart of the action figure exhibits one or more characteristics selected based on one or more of the relative position of accessory or the relative orientation of the accessory; or
(ii) the virtual counterpart of the accessory such that the virtual counterpart of the accessory exhibits one or more characteristics selected based on one or more of the relative position of accessory or the relative orientation of the accessory.

8. The method of claim 1, further comprising:
receiving, at the computer system, from the action figure via the established wireless connection, action figure state information identifying a position of the action figure relative to one or more other action figures; and
wherein presenting the virtual counterpart of the action figure comprises presenting, based on the relative position of the moveable part and the relative position of the action figure, the virtual counterpart of the action figure with one or more virtual counterparts of the one or more other action figures in the virtual environment.

9. The method of claim 1, further comprising:
receiving, at the computer system, from the action figure via the established wireless connection, action figure state information identifying an orientation of the action figure relative to one or more other action figures; and
wherein presenting the virtual counterpart of the action figure comprises presenting, based on the relative position of the moveable part and the relative orientation of the action figure, the virtual counterpart of the action figure with one or more virtual counterparts of the one or more other action figures in the virtual environment.

10. The method of claim 1, further comprising:
receiving, at the computer system, from the action figure via the established wireless connection, action figure state information identifying a state of another action figure,
wherein presenting the virtual counterpart of the action figure comprises presenting, based on the relative position of the moveable part and the state of the other action figure, the virtual counterpart of the action figure with a virtual counterpart of the other action figure in the virtual environment.

11. The method of claim 1, wherein the computer system comprises a server and a router.

12. The method of claim 1, wherein the computer system comprises a user device, the method further comprising:
providing, by the user device, the action figure state information to a host of the virtual environment;
receiving, at the user device, the presentation of the virtual counterpart of the action figure and the virtual environment,
wherein presenting the virtual counterpart of the action figure comprises providing the presentation of the virtual counterpart of the action figure and the virtual environment via an output device electronically coupled to the user device.

13. The method of claim 1, further comprising:
receiving, at the computer system, from the action figure via the established wireless connection, action figure behavior information identifying a behavior of the action figure; and
presenting, by the computer system, based on the behavior of the action figure, the virtual counterpart exhibiting one or more actions in the virtual environment that correspond to the behavior of the action figure.

14. The method of claim 1, wherein the virtual counterpart of the action figure comprises a virtual character entity that represents the action figure in the virtual environment.

15. A system for providing a presentation of a virtual counterpart of an action figure based on action figure state information obtained via wireless communication with the action figure, the system comprising:
one or more physical processors programmed to execute computer program instructions which, when executed, cause the one or more physical processors to:
detect an action figure within a wireless communication range, wherein the wireless communication range comprises at least one of a Near Field Communication (NFC) range, Bluetooth communication range, or a Wi-Fi communication range;

establish, based on the detection, a wireless connection between the computer system and the action figure;

receive, from the action figure via the established wireless connection, action figure state information identifying: (i) a position of a moveable part of the action figure relative to another part of the action figure, wherein the relative position of the moveable part is related to a pose exhibited by the action figure; and (ii) an environment-related state of the action figure related to a real-world environment of the action figure based on ambient temperature sensor data acquired by an action figure sensor;

present a virtual environment, wherein the virtual environment exhibits scenery having one or more aspects corresponding to, and based on, the ambient temperature sensor data; and present, based on the relative position of the moveable part and the environment-related state, a virtual counterpart of the action figure in the virtual environment, the virtual counterpart having at least one physical or behavioral attribute corresponding to the environment-related state.

16. The system of claim 15, wherein the one more physical processors are further caused to:

receive action figure state information identifying an orientation of the moveable part of the action figure relative to the other part of the action figure, wherein the relative orientation of the moveable part is related to the pose exhibited by the action figure, and wherein presenting the virtual counterpart of the action figure comprises presenting, based on the relative position and the relative orientation, the virtual counterpart of the action figure in the virtual environment having the same pose as the action figure.

* * * * *